US010357905B2

(12) United States Patent
Stigsson et al.

(10) Patent No.: US 10,357,905 B2
(45) Date of Patent: Jul. 23, 2019

(54) APPARATUS AND METHOD FOR THE PRODUCTION OF EXPANDED FOAM EMBRYOS

(71) Applicant: DIAB INTERNATIONAL AB, Laholm (SE)

(72) Inventors: Jerry Stigsson, Laholm (SE); Lars Gustav Wilhelmsson, Laholm (SE)

(73) Assignee: DIAB International AB, Laholm (SE)

( * ) Notice: Subject to any disclaimer, the term of this patent is extended or adjusted under 35 U.S.C. 154(b) by 42 days.

(21) Appl. No.: 15/102,674

(22) PCT Filed: Dec. 10, 2014

(86) PCT No.: PCT/SE2014/051474
§ 371 (c)(1),
(2) Date: Jun. 8, 2016

(87) PCT Pub. No.: WO2015/088431
PCT Pub. Date: Jun. 18, 2015

(65) Prior Publication Data
US 2016/0311140 A1    Oct. 27, 2016

(30) Foreign Application Priority Data

Dec. 12, 2013 (SE) .................................. 1351482

(51) Int. Cl.
C08J 9/30       (2006.01)
C08J 9/00       (2006.01)
C08J 9/04       (2006.01)
B29C 44/10      (2006.01)
C08K 5/00       (2006.01)
B29C 44/34      (2006.01)
B29C 44/58      (2006.01)
B29C 71/02      (2006.01)
B29C 35/02      (2006.01)
B29C 35/04      (2006.01)
B29C 45/77      (2006.01)
B29K 25/00      (2006.01)
B29K 27/06      (2006.01)
B29K 33/00      (2006.01)
B29K 67/00      (2006.01)
B29K 77/00      (2006.01)
B29C 44/42      (2006.01)
B29K 105/00     (2006.01)
B29K 105/04     (2006.01)

(52) U.S. Cl.
CPC .......... B29C 44/10 (2013.01); B29C 35/0222 (2013.01); B29C 35/04 (2013.01); B29C 44/3484 (2013.01); B29C 44/585 (2013.01); B29C 44/586 (2013.01); B29C 45/77 (2013.01); B29C 71/02 (2013.01); C08J 9/30 (2013.01); C08K 5/0025 (2013.01); B29C 35/041 (2013.01); B29C 35/049 (2013.01); B29C 44/421 (2013.01); B29C 2945/76498 (2013.01); B29C 2945/76672 (2013.01); B29K 2023/06 (2013.01); B29K 2025/06 (2013.01); B29K 2027/06 (2013.01); B29K 2033/12 (2013.01); B29K 2067/003 (2013.01); B29K 2077/00 (2013.01); B29K 2105/0005 (2013.01); B29K 2105/04 (2013.01); C08J 2201/026 (2013.01); C08J 2203/04 (2013.01); C08J 2205/044 (2013.01); C08J 2327/06 (2013.01)

(58) Field of Classification Search
CPC .... C08J 2205/044; C08J 9/30; C08J 2327/06; C08J 2201/026; B29K 2105/0005; B29K 2027/08; B29K 2025/08; B29K 2025/06; B29K 2033/12; B29K 2069/00; B29K 2001/08; B29K 2001/12; B29K 2001/14; B29K 2067/003; B29K 2023/06; B29K 2077/00; B29K 2105/04
See application file for complete search history.

(56) References Cited

U.S. PATENT DOCUMENTS

| 3,703,571 | A |   | 11/1972 | Roberts |
| 4,187,159 | A | * | 2/1980  | Goswami ............. C08F 259/04 521/145 |
| 4,344,903 | A | * | 8/1982  | Pascouet ................ B29C 33/04 249/79 |
| 4,469,819 | A | * | 9/1984  | Lemoine .................. C08J 9/08 264/54 |
| 6,129,870 | A |   | 10/2000 | Hettinga |
| 6,146,562 | A |   | 11/2000 | Hettinga |
| 6,368,701 | B1|   | 4/2002  | Nomura et al. |

(Continued)

FOREIGN PATENT DOCUMENTS

CN     1960844 A      5/2007
CN   101580573 A     11/2009

(Continued)

OTHER PUBLICATIONS

CN Office Action dated Feb. 20, 2017.
(Continued)

Primary Examiner — Kara B Boyle
(74) Attorney, Agent, or Firm — Harness, Dickey & Pierce, P.L.C.

(57) ABSTRACT

The present invention relates to an injection molded product, an expanded foam product, a method of injection molding a plastisol an expandable plastic embryo during which the foaming of the plastic embryo is suppressed throughout the molding operation. The invention further relates to a mold and an injection molding device.

17 Claims, 17 Drawing Sheets

(56) References Cited

U.S. PATENT DOCUMENTS

| | | |
|---|---|---|
| 2005/0230861 A1 | 10/2005 | Hiroyuki et al. |
| 2007/0200266 A1 | 8/2007 | Elser |
| 2008/0290543 A1* | 11/2008 | Okamoto .............. B29C 44/586 264/55 |
| 2009/0140447 A1 | 6/2009 | Kawamura et al. |
| 2010/0034918 A1* | 2/2010 | Karlsson ............. B29C 33/0038 425/4 R |
| 2010/0068487 A1* | 3/2010 | Lauri .................... B23K 20/10 428/218 |
| 2013/0150474 A1 | 6/2013 | Lauri et al. |

FOREIGN PATENT DOCUMENTS

| | | |
|---|---|---|
| CN | 101812232 A | 8/2010 |
| EP | 0513930 A1 | 11/1992 |
| EP | 1393876 A1 | 3/2004 |
| EP | 1582545 A1 | 10/2005 |
| GB | 1219803 A | 1/1971 |
| WO | WO-2007141647 A1 | 12/2007 |
| WO | WO-2009022954 A1 | 2/2009 |

OTHER PUBLICATIONS

International Search Report and Written Opinion of the International Searching Authority for PCT/SE2014/051474, ISA/SE, dated Mar. 19, 2015.
Supplemental European Search Report dated Sep. 5, 2017.

* cited by examiner

Fig. 17.

| Formulation | Example 1 | Example 2 | Example 3 | Example 4 | Example 5 | Example 6 | Example 7 | Example 8 | Example 9 | Example 10 | Example 11 | Example 12 | Example 13 | Example 14 |
|---|---|---|---|---|---|---|---|---|---|---|---|---|---|---|
| ePVC | 30.8% | 30.8% | 30.8% | 30.8% | 8.1% | 8.2% | 5.8% | 5.8% | 5.8% | 9.0% | 34.0% | 34.0% | | |
| sPVC | 15.1% | 15.1% | 15.1% | 15.1% | 35.6% | 35.9% | 34.2% | 34.2% | 34.2% | 41.0% | 6.0% | 6.0% | 34.0% | 6.0% |
| Dicarboxylic anhydride | 10.0% | 10.0% | 10.0% | 10.0% | 11.9% | 11.9% | 6.0% | 6.0% | 6.0% | 4.0% | 3.6% | 2.5% | 6.0% | 2.5% |
| Blowing agent | 4.4% | 4.4% | 4.4% | 4.4% | 4.4% | 3.6% | 3.6% | 3.6% | 3.6% | 2.8% | 50.0% | 45.4% | 3.6% | 45.4% |
| MDI | 39.6% | 39.6% | 39.6% | 39.6% | 39.4% | 39.8% | 49.8% | 49.8% | 49.8% | 42.6% | 0.1% | 0.1% | 50.0% | 0.1% |
| Lubricant | 0.1% | 0.1% | 0.1% | 0.1% | 0.1% | 0.1% | 0.1% | 0.1% | 0.1% | 0.1% | 0.5% | 0.5% | 0.1% | 0.5% |
| Surfactant | 0.0% | 0.0% | 0.0% | 0.0% | 0.5% | 0.5% | 0.5% | 0.5% | 0.5% | 0.5% | | 5.8% | 0.5% | |
| PMMA/PBMA co-polymer (acrylic resin) | | | | | | | | | | | 5.8% | | 5.8% | 45.5% |
| SAN resin | | | | | | | | | | | | 45.5% | | |
| | 100.0% | 100.0% | 100.0% | 100.0% | 100.0% | 100.0% | 100.0% | 100.0% | 100.0% | 100.0% | 100.0% | 100.0% | 100.0% | 100.0% |
| Machine settings | | | | | | | | | | | | | | |
| Shot Volume | 600 | 350 | 350 | 250 | 300 | 300 | 270 | 270 | 270 | 350 | 270 | 270 | 270 | 270 |
| Barrel temperature (°C) | 160 | 170 | 170 | 160 | 160 | 160 | 163 | 163 | 163 | 160 | 160 | 160 | 160 | 160 |
| Cooling time (s) | 960 | 360 | 360 | 200 | 360 | 360 | 300 | 300 | 300 | 360 | 300 | 360 | 300 | 300 |
| BackPressure (bar) | 110 | 150 | 150 | 100 | 125 | 125 | 150 -> 125 | 150 -> 125 | 150 -> 125 | 125 | 125 | 125 | 125 | 125 |
| "Pause pressure" (bar) | 110 | 150 | 150 | 100 | 125 | 125 | 125 | 125 | 125 | 125 | 125 | 125 | 125 | 125 |
| Cavity pressure (bar) | 300 | 150 | 300 | 200 | 125 | 125 | 150 | 150 | 200 | 200 | 200 | 200 | 200 | 200 |
| Expansion settings | | | | | | | | | | | | | | |
| Dry temp | | 98 | 98 | 98 | 92 | 92 | 94 | 92 | 92 | 92 | 85 | 85 | 70 | 85 |
| Dry time | | 1 | 1 | 1 | 1 | 1 | 1 | 1 | 1 | 1 | 1 | 1 | 1 | 1 |
| Wet temp | 88 | 91 | 91 | 88 | 85 | 85 | 87 | 81 | 81 | 85 | 75 | 75 | 65 | 75 |
| Wet time | 1 | 1 | 1 | 2 | 2 | 1 | 3,5 | 2 | 2 | 5 | 2 | 2 | 2 | 2 |
| Compressive test and cell structure | | | | | | | | | | | | | | |
| Density (kg/m3) | 84.7 | 65.7 | 80.1 | 111.0 | 67.0 | 55.05 | 61.6 | 67.3 | 59.9 | 83.3 | 61.5 | 56.1 | 72,0 | 68,0 |
| Compr.Strength (Mpa) | 2.16 | 1.37 | 1.85 | 2.72 | 1.30 | 0.90 | 1.24 | 1.24 | 1.15 | 1.83 | 1.21 | 0.99 | 1.46 | 1.32 |
| Compr. Modulus (Mpa) | 184.7 | 114.2 | 149.0 | 207.4 | 89.4 | 64.7 | 111.9 | 107.7 | 95.6 | 140.6 | 96.3 | 86.0 | 118.0 | 108.0 |
| Rel. Compr.Strength (Mpa/kg/m3) | 0.026 | 0.021 | 0.023 | 0.024 | 0.019 | 0.016 | 0.020 | 0.018 | 0.019 | 0.022 | 0.020 | 0.018 | 0.020 | 0.019 |
| Rel. Compr.Modulus (Mpa/kg/m3) | 2.18 | 1.74 | 1.86 | 1.87 | 1.34 | 1.17 | 1.82 | 1.60 | 1.60 | 1.69 | 1.57 | 1.53 | 1.64 | 1.59 |
| Cell size (mm) | 0.066 | 0.125 | 0.085 | <0.05 | 0.213 | 0.154 | 0.305 | 0.591 | 0.0913 | 0.0739 | 0.113 | 0.148 | 0.095 | 0.102 |
| | | | | | | | | 0.118 Bi-modal | | | | | | |

APPARATUS AND METHOD FOR THE PRODUCTION OF EXPANDED FOAM EMBRYOS

CROSS-REFERENCE TO RELATED APPLICATIONS

This application is a 371 U. S. National Stage of International Application No. PCT/SE2014/051474, filed on Dec. 10, 2014 and claims priority to Swedish Patent Application No. 1351482-3, filed Dec. 12, 2013. The entire disclosures of the above applications are incorporated herein by reference.

BACKGROUND OF THE INVENTION

The present invention relates to an apparatus and process for the production of a cellular, expanded material based on suitable polymers.

Today, PVC-based rigid foam polymer materials are being widely used as core material in sandwich structures in the naval or aeronautic sector, or as thermal/acoustic insulators in the building sector. In a sandwich structure the core separates two structurally more rigid materials, such as fibre reinforced plastics (FRP), metal or the like. Such sandwich structures have many advantages compared to more traditional single layer structures, such as lower weight, insulation properties etc. Whilst other rigid foam polymer materials, such as foamed polyurethane etc. can be produced using streamlined continuous methods, the production of PVC based rigid foam polymer materials involves moulding of discrete partially expanded bodies (hereafter referred to as embryo bodies) under high pressure in a press. The embryo bodies are subsequently subjected to a chemical-physical treatment to obtain the rigid foam polymer material.

More in detail, the production process of a PVC based rigid foam polymer material initially involves formation of a plastisol paste consisting of a mixture of powders (PVC and other compounds) and liquid substances (in particular isocyanates). The paste is filled in a closed mould cavity and is subjected to a heating and subsequent cooling process under high pressure resulting in a partially expanded embryo body. The embryo body is then further expanded through an additional heat treatment in water and/or a steam oven. The formation of the final rigid foamed material is a result of a hydrolysis reaction of the isocyanate groups present in the material, with the subsequent build-up of a polymer which crosslinks the chemical structure. The moulding process comprises heating the plastisol in a closed mould, whereby a high pressure is created by the thermal expansion of the plastisol and the activation of the blowing agent dissolved therein. The plastisol is kept at elevated temperature for a predetermined period of time in order to allow the plastisol to gelatinize, following which the mould cavity is cooled to a temperature that is low enough to allow removal of the embryo body from the mould without it expanding uncontrollably.

The products obtainable starting from plastisol are characterised by certain ranges of mechanical properties and the foamed products require long gelation times under pressure, long expansion times and long curing times.

As described above, the cellular foamed-polymer products are produced through mixing of powders (PVC, anhydride, chemical blowing agents, pigments) with liquids (e.g. isocyanates and liquid anhydrides and sometimes plasticizers) into a fairly viscous mixture known as a "plastisol". Said mixture, of high viscosity, after being compounded in a dissolver, is cast into a mould, and the temperature is then increased under pressure, until a temperature of 150° C. to 200° C. is reached, in order to cause the gelation of polyvinyl chloride and the decomposition of the blowing agent to take place. The chemical blowing agents decompose to form gaseous nitrogen that is either dissolved into the newly-formed gel or forms tiny bubbles. This semi-foamed gel is known as an "embryo". After a predetermined length of time which is sufficient for the embryo to achieve the desired composition the mould and embryo are allowed to cool.

Once the embryo temperature has dropped enough for it to become shape-stable so that it can be released from the mould without damage or uncontrollable expansion, it is transferred to an expansion process unit such as a chamber or tank where it can be foamed, i.e. where it is allowed to expand, to the desired density by being heated in the presence of hot water or steam. The hot water or steam expansion results in a decrease in the viscosity of the embryo as it warms up. Once it has a sufficiently low viscosity, the embryo will expand owing to the pressure of the dissolved nitrogen and additional gas formed through the reaction of the isocyanate content of the gel with the water that diffuses into the gel. The chemical reactions occur both during the initial compression moulding, where the chemical blowing agents decompose and emit nitrogen gas, and during the later expansion when a complex series of water, isocyanate and anhydride reactions occur, giving a final, cured foam with cross linked chemical structure that could be described as a polyamide-polyimid-PVC-polyisocyanurate-polyurea.

It will be apparent from this description that the industrial practice of this batch process is complicated. Furthermore it requires a lot of energy to warm up the metal moulds and press platen in the compression moulding step to form the embryos, and most of this energy is lost when the mould is allowed to cool before releasing the embryo. Furthermore, the moulds have to be moved into and out of the press which, due to their weight and size, is labour intensive and time consuming. Each mould is usually constructed to be able to produce only a single thickness of embryo which limits the flexibility of the system. As the moulds are heated, maintained warm while gelation takes place and then must be cooled before the embryo can be released, the cycle time is high (1.5-2.0 min per mm mould depth). The method only functions satisfactorily when using emulsion polymerised PVC (ePVC) with a high pH value, as the emulsifiers in the ePVC helps catalyse chemical reactions which generate the heat necessary to accelerate the gelling process in the centre of the deep mould used in the process. This reaction also requires silicone-based surfactants and/or quatenary ammonium carboxylate in order to trigger the chemical reactions which generate heat inside the plastisol and accelerate the gelling process. Another reason for the use of ePVC is that it is in the form of small particles which can gel easily without the need of friction forces. The cheaper suspension polymerised PVC (sPVC) cannot be used in this process as it is in the form of large particles which need to be quickly melted using friction in order to generate a homogeneous melt.

A further problem with this process is that it produces undesirably large cells and the formation of the cells is difficult to control as there is no means available to control the pressure inside the mould during the cooling phase.

BRIEF DESCRIPTION OF THE INVENTION

The present invention relates to a product, injection moulding units, and methods for the production of embryos which use less energy than the prior art methods. This is achieved by use of an injection moulding apparatus in which the temperature and pressure in the injection barrel and the temperature and pressure in the injection mould can be controlled. A method for achieving this has the steps of injecting the hot plastic melt into an unheated expandable mould while controlling the injection temperature and pressure as well as the mould temperature and pressure in order to prevent premature foaming of the melt. Once the mould is filled, while maintaining the pressure in the mould, the temperature of the hot melt is reduced to a mould opening temperature which is cool enough so that the embryo is sufficiently viscous so controlled expansion of the embryo can take place, i.e. the embryo is sufficiently viscous so that it is strong enough to prevent it rupturing when the mould opens and the pressure on the embryo drops, while at the same time the embryo is sufficiently fluid so that it can foam and expand following the pressure drop caused by opening the mould. The embryo can then be released from the mould. The method according to the present invention also makes it possible to produce foamed product with controlled cell size and the method is also applicable to various kinds of expandable polymer systems. The present invention facilitates even injection moulding of expandable polymers which previously have been shown hard or even impossible to control.

By using this new method to produce expandable embryos the total process time has decreased from 1.5-2.0 min/mm mould depth of the prior art to 0.2-0.3 min/mm mould depth for the novel method.

In a first aspect the present invention relates to an injection moulded product obtainable by preparing an embryo having a volume $V_{final}$ comprising the steps of:
  providing a plastisol;
  providing an injector unit for injection moulding comprising a barrel with a nozzle and a control unit adapted to control the back pressure $P_{back}$ inside the barrel and to maintain said pressure above a critical foaming pressure;
  providing a mould comprising an injector port, a force exerting means, a first and a second mould half forming a mould cavity with a cavity volume, wherein the mould halves are moveable in relation to each other to vary the cavity volume, wherein the mould is provided in a cold state having a cavity volume of $V_{min}$ and wherein the force exerting means exerts a controlled maintained clamping force $F_{set}$ on the mould cavity creating a pressure $P_4$ inside the mould;
  connecting the injector port of the mould to the nozzle of the injector unit;
  adding the plastisol to the injector unit;
  preparing a shot volume $V_{shot}$ of hot melt of the plastisol in the injector unit;
  injecting the hot melt into the cold mould cavity of volume $V_{min}$;
  continuing injecting the hot melt into the mould cavity creating a cavity pressure $P_{cavity}$ equal to or higher than the clamping pressure $P_4$ forcing the mould to expand so that it can receive the shot volume $V_{shot}$;
  allowing the injected hot melt to cool in order to form an embryo whereby the volume of the embryo contracts during the controlled maintained clamping force $F_{set}$ allowing the mould cavity to contract reducing the risk of a pressure drop in the cavity causing foaming in the formed embryo;
  opening the mould and removing the formed injected moulded embryo; and
  exposing said embryo to expansion and cross-linking the embryo using heat and, water or steam.

In a second aspect the present invention relates to an expanded PVC foam;
wherein the expanded foam has a compressive modulus to density ratio of at least 1.28 for foams with a density of 25-40 kg/m³, or at least 1.40 for foams with a density of 41-115 kg/m³, or at least 1.69 for foams with a density of 116-420 kg/m³.

Another aspect relates to a method for producing a foamable embryo having a volume $V_{final}$ using injection moulding comprising the steps of:
  providing a plastisol;
  providing an injector unit for injection moulding comprising a barrel with a nozzle and a control unit adapted to control the back pressure $P_{back}$ inside the barrel and to maintain said pressure above a critical foaming pressure;
  providing a mould comprising an injector port, a force exerting, means a first and a second mould half forming a mould cavity with a cavity volume, wherein the mould halves are moveable in relation to each other to vary the cavity volume, wherein the mould is provided in a cold state having a cavity volume of $V_{min}$ and wherein the force exerting means exerts a controlled maintained clamping force $F_{set}$ on the mould cavity creating a pressure $P_4$ inside the mould;
  connecting the injector port of the mould to the nozzle of the injector unit;
  adding the plastisol to the injector unit;
  preparing a shot volume $V_{shot}$ of hot melt of the plastisol in the injector unit;
  injecting the hot melt into the cold mould cavity of volume $V_{min}$;
  continuing injecting the hot melt into the mould cavity creating a cavity pressure $P_{cavity}$ equal to or higher than the clamping pressure $P_4$ forcing the mould to expand so that it can receive the shot volume $V_{shot}$;
  allowing the injected hot melt to cool in order to form an embryo whereby the volume of the embryo contracts during the controlled maintained clamping force $F_{set}$ allowing the mould cavity to contract reducing the risk of a pressure drop in the cavity causing foaming in the formed embryo; and
  opening the mould and removing the formed injected moulded embryo.

Yet another aspect of the present invention relates to a mould for performing the method described above comprising a first and a second mould half forming a mould cavity with a cavity volume, wherein the mould halves are moveable in relation to each other to vary the cavity volume, an inlet port arranged in the first mould half able to be brought into a sealing contact with an injector unit, means for cooling the mould, a force exerting means adapted to exert a controlled maintained clamping force on said mould and means for controlling the clamping force in order to allow the cavity volume to increase during injection of hot melt which exerts a force on the second mould half wherein the force exerted by the hot melt is larger than the clamping force pushing the second mould half away from the first mould half and to allow the mould cavity to contract during cooling of the embryo reducing the risk of a pressure drop in the cavity causing pre-mature foaming in the formed embryo.

Yet another aspect of the present invention relates to a an injection moulding apparatus comprising an injector unit suitable for injection moulding comprising a control unit adapted to control the back pressure $P_{back}$ inside the barrel and maintain said pressure above a critical foaming pressure $P_{critical}$ and a mould according to the present invention as described above.

All embodiments disclosed herein are applicable to all aspects.

BRIEF DESCRIPTION OF THE DRAWING

FIG. 17 experimental set ups for formation of products according to the present invention.

DETAILED DESCRIPTION OF THE INVENTION

In the present invention the term "plastisol" means a suspension of polymeric particles and cross-linker.

Figure 1:
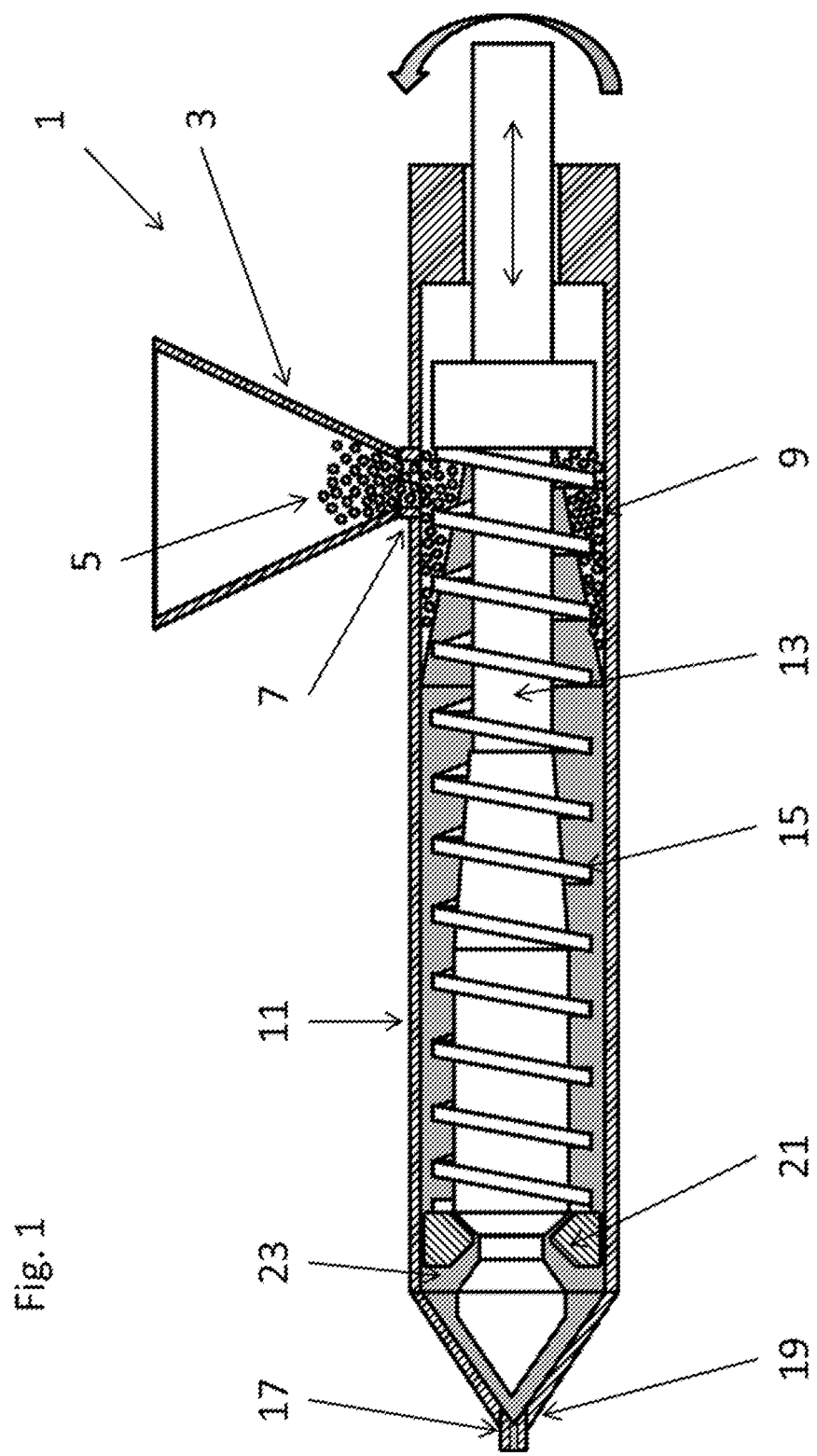
FIG. 1 shows schematically a partial section through a prior art injection unit with a feed hopper.

FIG. 1 shows schematically a partial cross-section through a conventional injection unit 1 for use in the manufacture of injection-moulded products. Injector unit 1 comprises a feed hopper 3 into which a thermoplastic material 5, which is to be injection moulded, is provided, normally in the form of pellets or powder. The hopper leads via an inlet opening 7 to a bore 9 in a heated barrel 11 into which the thermoplastic can fall. Bore 9 contains a reciprocating screw-ram 13 which has helical flutes 15 arranged on its exterior surface. Screw-ram 13 can be made to rotate by a motor (not shown) and by means of this rotation, the flutes 15 cause material to move along the inside of the barrel. In this process, the pellets or powder are solid at the inlet area of the bore, which makes it unnecessary to have any special "dynamic sealing" on the ram-screw shaft in this area. Screw-ram 13 can also be moved in the longitudinal direction of the barrel by ram means (not shown) in order to force material out of a nozzle 17 fitted at the outlet end 19 of the barrel. An axially movable check ring 21 of conventional type used in injection moulding which acts as a non-return valve is arranged in the barrel forming a material-reserving section 23 between the check ring and the nozzle, which material-reserving section 23 has a volume ($V_{shot}$) sufficient to fill the mould into which the material is to be injected. Friction between the material and the screw-ram and inner wall of the barrel and external heating of the barrel cause the pellets or powder of thermoplastic material to melt as it is fed from the inlet opening and once a sufficient or pre-set volume of molten material has been collected in the material-reserving section 23, the rotation of the screw-ram is stopped and the screw-ram is advanced towards the nozzle which causes the material in the material reserving section to be injected into the mould through the nozzle at the end of the barrel. Once the plastic has solidified in the mould the injection unit is ready for metering the next shot. The next shot metering starts with the start of the turning motion of the screw-ram which again builds up a certain pressure (back pressure) in the material reserving section. The pressure build up by the accumulation of melted plastic in the material reserving section which has been fed there by the turning motion of the screw will push the screw ram "backwards" during metering.

Figure 2:
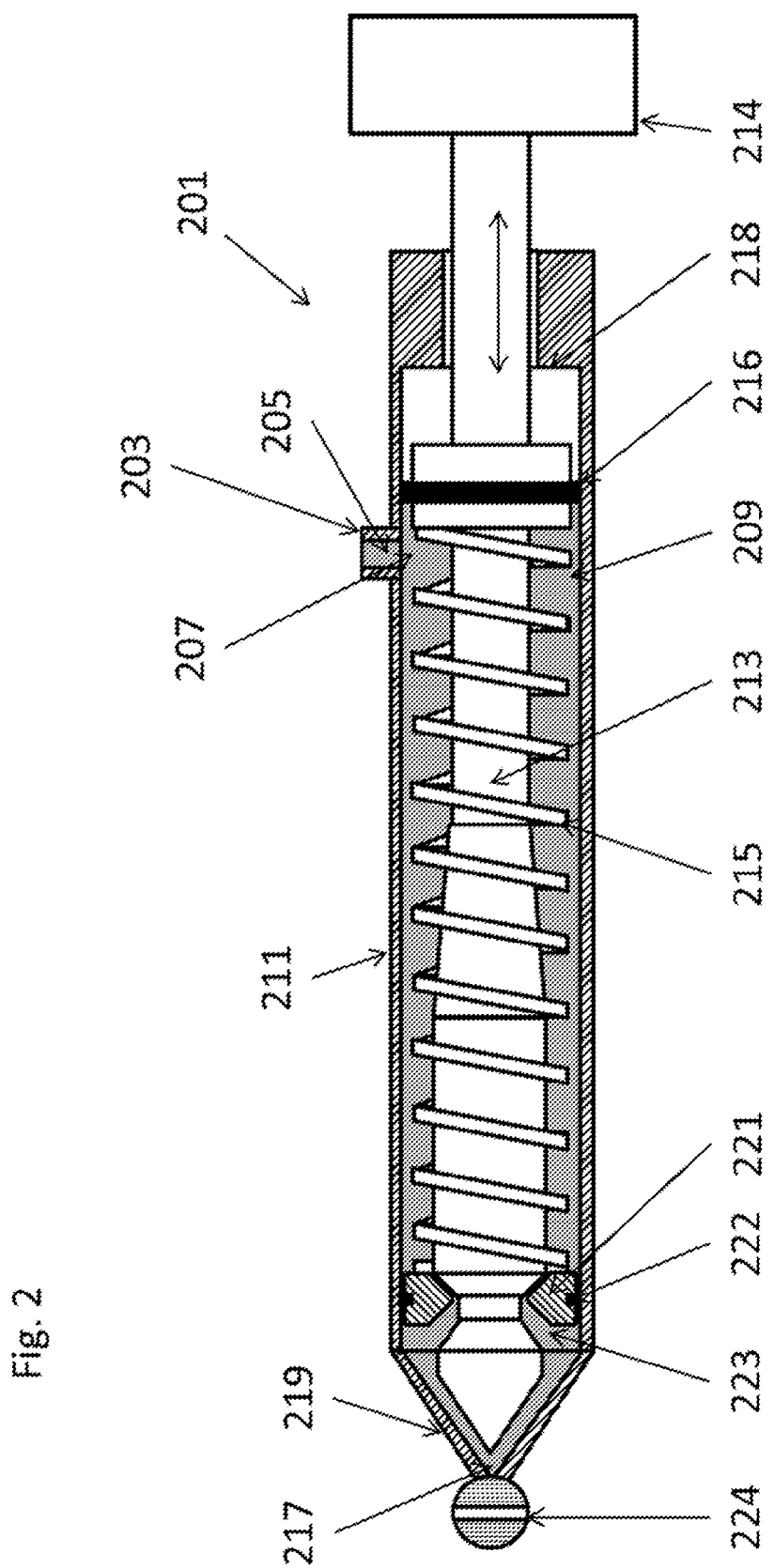
FIG. 2 shows schematically a partial section through an injection unit with a feed line in accordance with an embodiment of the present invention.

FIG. 2 shows schematically a partial cross-section through an injection unit 201 in accordance with one embodiment of the present invention for the manufacturing of embryos. Injector unit 201 comprises a pressurised inlet line 203 into which a plastisol 205 which is to be injection moulded, is provided. The inlet line leads via an inlet opening 207 to a bore 209 in a heated barrel 211 into which the plastisol can flow under pressure. Bore 209 contains a reciprocating screw-ram 213 which has helical flutes 215 arranged on its exterior surface. In order to prevent leakage of the liquid plastisol out of the barrel, a dynamic seal 216 is provided in the bore, for example on the shaft of the screw ram, between the inlet opening 207 and the closed end 218 of the barrel. Screw-ram 213 can be made to rotate by a motor (not shown) and by means of this rotation, the flutes 215 cause material to move along the inside of the barrel. Screw-ram 213 can also be moved in the longitudinal direction of the barrel by ram means 214 in order to force material out of a nozzle 217 fitted at the outlet end 219 of the barrel. Means 214 may also act as a control unit adapted to continuously control the back pressure $P_{back}$ inside the barrel and maintain said pressure above the critical foaming pressure. The control unit may also be a separate unit from the ram means 214. An axially-movable check ring 221 which acts as a non-return valve is positioned between the screw-ram and the barrel to form a material-reserving section 223 between the check ring and the nozzle. The check ring 221 not only has to seal off pressures which are sufficiently high enough to prevent premature foaming in the melt but it also has to prevent leakage of the low viscosity melted plastisol and prevent unwanted back flow of the hot melt in the material-reserving section 223 during metering and injection, it is therefore preferably provided with an extra seal 222 which provides a tighter seal than the seal used in a conventional injection moulding injector unit which does not have to seal such low-viscosity material. The material-reserving section 223 has a volume sufficient to fill the mould into which the material is to be injected. The shot volume is variable and is set to get the desired mould depth or final part thickness, which in a further step in the process will lead to the desired thickness or volume $V_{final}$ of the foam block formed using the process. The nozzle 217 is provided with a movable nozzle shut-off valve 224 which can be moved into a closed position where it can seal the nozzle in order to maintain pressure within the barrel and which can be moved into an injection position in which the nozzle is open and can be connected to a mould. The nozzle shut-off valve may be of any suitable type such as closing pin valve, sliding gate valve or bolt shut off valve.

Rotation of the ram-screw causes the plastisol to advance through the barrel and once a sufficient volume of molten material has been collected in the material-reserving section 223, the screw-ram can be advanced towards the nozzle from its position and the shut-off valve moved to the injection position which causes the material in the material reserving section to be injected into the mould through the nozzle at the end of the barrel. The melted plastisol in the material-reserving section 223 is preferably pressurized and gas saturated. The mould is pushed open by the melt, i.e. the volume of the mould cavity is increased, during the injection phase—the expansion, the opening movement of the mould during injection, is controlled to maintain a pressure in the mould which will prevent undesired cell nucleation or foaming of the plastic melt by a constant clamping force $F_{set}$.

Once the injection cycle is complete the nozzle shut-off valve is moved into the closed position and the metering for the next injection shot can begin. During the metering the screw-ram rotates in order to drive plastisol melt towards the material-receiving section while at the same time the screw-ram itself is driven back to the start position corresponding to the desired shot volume. During this return movement of the screw-ram, the ram means 214 maintains a predetermined back pressure on the screw ram in order to ensure that the pressure exerted on the material in the barrel is sufficiently high (preferably above the critical foaming pressure $P_{critical}$) to prevent the material from foaming within the barrel.

Figure 3:
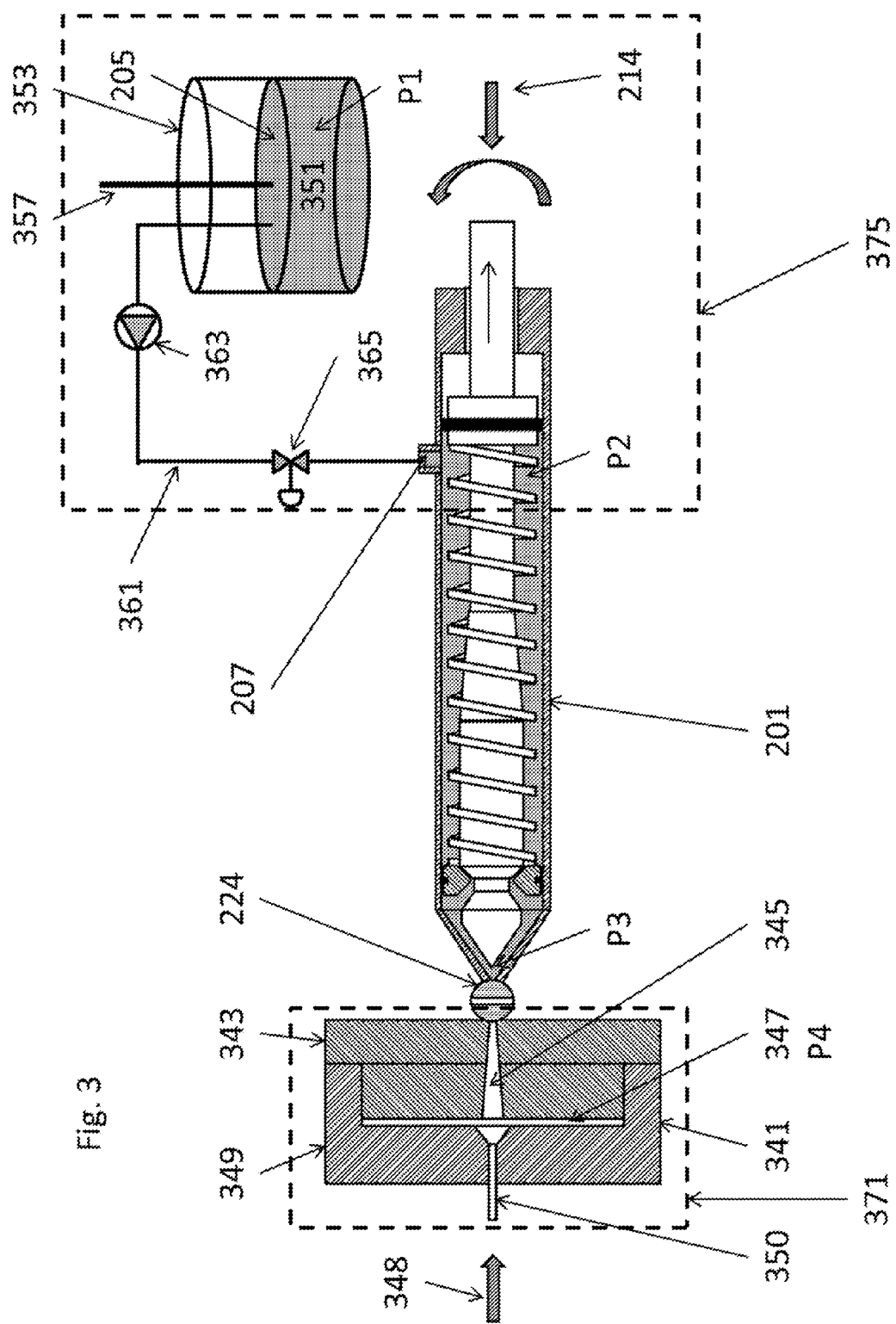
FIG. 3 shows schematically an apparatus for producing semi-foamed embryos in accordance with the present invention.

FIG. 3 shows schematically a first embodiment of an apparatus in accordance with the present invention for forming semi-foamed plastisol embryos. The apparatus comprises an injector 201 of the type described above which is intended to be used to fill an expandable mould 341 with plastic melt. The pressure inside the bore of injector unit 201 increases from the inlet pressure $P_2$ in the region of inlet opening 207 to the pressure $P_3$ behind the nozzle shut-off valve 224.

The mould comprises a first mould half 343 including an injection port 345 through which plastic melt can be injected into the mould cavity 347 which is formed between the first mould half 343 and a second mould half 349. During filling of the mould, the mould halves 343, 349 can be moved apart while maintaining the clamping pressure $P_4$ inside the mould cavity 347 formed between them by means of force exerting means 348, e.g. one or more hydraulically- or pneumatically- or electrically-operated actuators. Said force exerting means 348 may also act as a control unit adapted to control the clamping pressure and to maintain the clamping pressure above the critical foaming pressure $P_{critical}$. Preferably no sealing means are provided between the mutually facing surfaces of the male mould half and the female mould half which move past each other as the mould expands and contracts. Such sealing means are not necessary as the mould halves are not heated and leakage of the injected plastic melt in the gap between these mutually facing surfaces is prevented by the rapid cooling of the plastic melt as it comes into contact with the cold mould halves, which increases its viscosity so that it is unable to flow through the narrow gap between the mould halves. Ejector means, for example a compressed air supply or, as shown in the figures, an ejector pin 350 are provided in one mould half, for example the second mould half 349 to eject the moulded embryo.

As an alternative or complement to using a nozzle shut-off valve which can be moved into a closed position where it can seal the nozzle in order to maintain pressure within the barrel and which can be moved into an injection position in which the nozzle is open and can be connected to a mould, it is possible to use a hot runner system which is provided with a closing pin in the mould. This closing pin can be moved from an open, injection position which allows plastic melt to be injected into the mould or to a closed position which prevents the plastic melt from being injected into the mould (and also prevents back flow of injected plastic melt from leaving the mould during subsequent cooling time). If a nozzle shut-off valve is provided on the injection unit then this can be left continuously open during normal production.

A source of supply 351 of plastisol is connectable to the inlet opening 207 of injector unit 201 via a supply line 361. The source of supply of plastisol can comprise a pressurised mixing container 353 under pressure $P_1$ into which the constituent ingredients of the plastisol 205 can be provided and then mixed with a mixer 357. The mixer may be any suitable type of mixer. Alternatively the source of supply of plastisol can be an unpressurised container which contains premixed plastisol. Supply line 361 is provided with a dosing pump 363 to enable the plastisol to be fed from mixing container 353 to inlet opening 207 and a valve 365 is provided in order to control the pressure inside the supply line 361 and to hinder back flow from the barrel into the supply line 361.

The mould region 371 of the device is shown surrounded by dashed lines and preferably is not heated thus saving energy compared with prior art units. The feed region 375, shown surrounded by dashed lines encompassing the source of supply of plastisol, the feed line and preferably also the inlet end of the injector unit, is not heated. Preferably only the regions of the injector unit forward of the inlet opening 207 are heated, thus saving energy.

Figure 4:
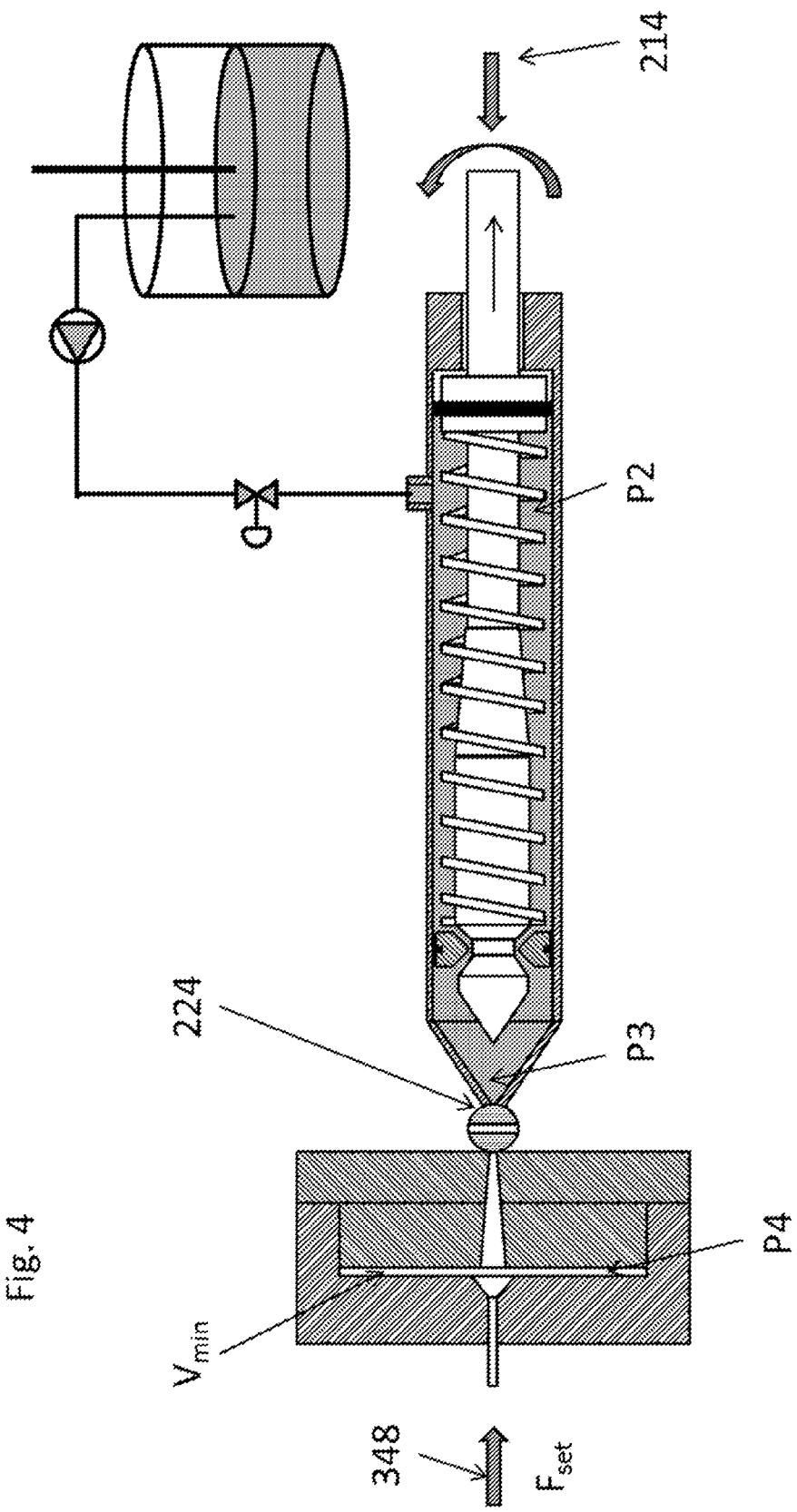
FIG. 4 shows schematically the apparatus of FIG. 3 in the metering phase of a first embodiment of a method of producing semi-foamed embryos in accordance with the present invention.

FIGS. 4-11 shows the consecutive phases in a first embodiment of a method of producing semi-foamed embryos using an apparatus for producing embryos in accordance with the present invention. As shown in FIG. 4, at the end of the metering phase, the mould is closed, the dosing pump is on to feed more material into the barrel, the ram-screw is rotated which forces more material into the material-receiving section at the same time as the pressure builds up due to the accumulation of this material in the material-receiving section forces the ram-screw back down the barrel, during which reverse movement the ram means maintains a pressure opposing the movement of the ram-screw in order to prevent undesired foaming/cell nucleation of the material. When the screw-ram is in the return or back position the ram means 214 continues to exert a force in the direction of the nozzle on the screw ram so that a pressure $P_{back}$ (i.e. a back pressure) is always present inside the barrel, both along the screw and in the material-receiving section. The nozzle shut-off valve 224 is closed and the pressure inside the bore is $P_2$ near the inlet and rises to $P_3$ at the nozzle shut-off valve. During the metering phase the pressure behind the nozzle shut-off valve $P_3$ is equal to the back pressure $P_{back}$. This corresponds to step 1101 and 1102 in FIG. 11. It is preferred that the pressure level inside the bore is controlled and maintained above the critical foaming pressure $P_{critical}$ throughout the whole injection moulding process. The pressure inside the barrel, and even in the mould, is preferably controlled all the time or continuously using any suitable means.

Figure 5:
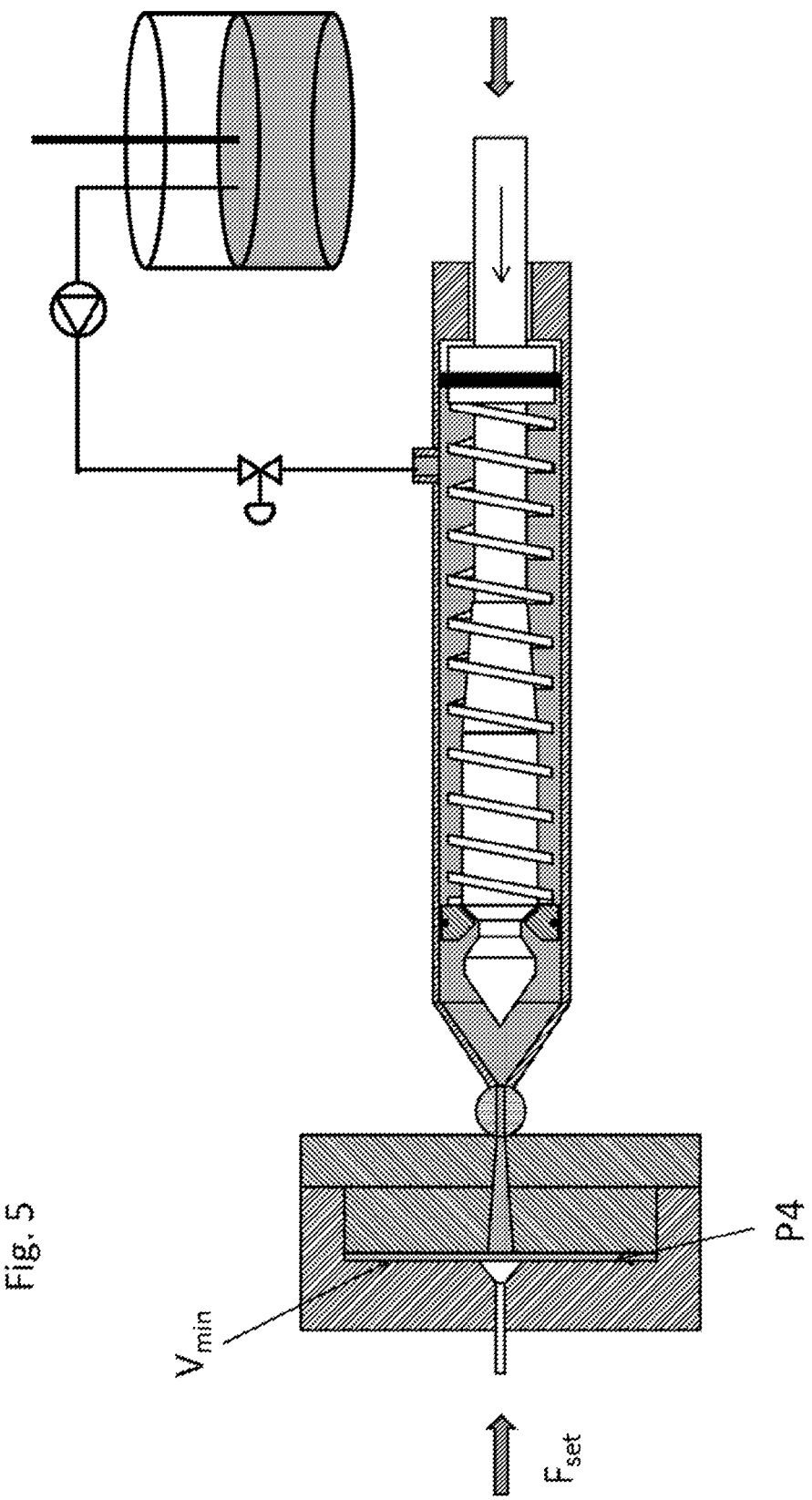
FIG. 5 shows schematically the apparatus of FIG. 3 in the initial injection phase of the first embodiment of a method of producing semi-foamed embryos in accordance with the present invention.

FIG. 5 shows schematically the apparatus of FIG. 3 in the initial injection phase in which the small initial mould volume $V_{min}$ is rapidly filled. When the shut-off nozzle valve opens the mould is closed by actuator 348 with a clamping force $F_{set}$ and the mould cavity volume is at its minimum $V_{min}$ with the pressure $P_4$ inside it being the same as ambient pressure. The rapid filling is achieved for example by opening the nozzle shut-off valve at the same time as moving the screw-ram towards the nozzle with sufficient force to achieve the specified injection speed $v_{inj}$ cubic centimeters per second (ccm/s)—while maintaining the mould in its closed position with clamping force $F_{set}$. Preferably the initially filling of the mould in this phase takes less than one second and preferably takes less than one tenth of a second. This corresponds to step 1103 in FIG. 11. The initial fill seals the gap between the mutually facing mould half walls and allows the pressure inside the mould (P4) to rise to the desired cavity pressure $P_{cavity}$. This phase is a very short phase since the $V_{min}$ is filled very fast.

Preferably $V_{min}$ corresponds to an initial cavity depth greater than 0.2 mm and less than 4.2 mm, more preferably between 0.5 mm and 2.0 mm, or between 0.7 and 1.6, or between 0.9 mm and 1.4 mm, or between 1.0 and 1.2 mm.

Figure 6:
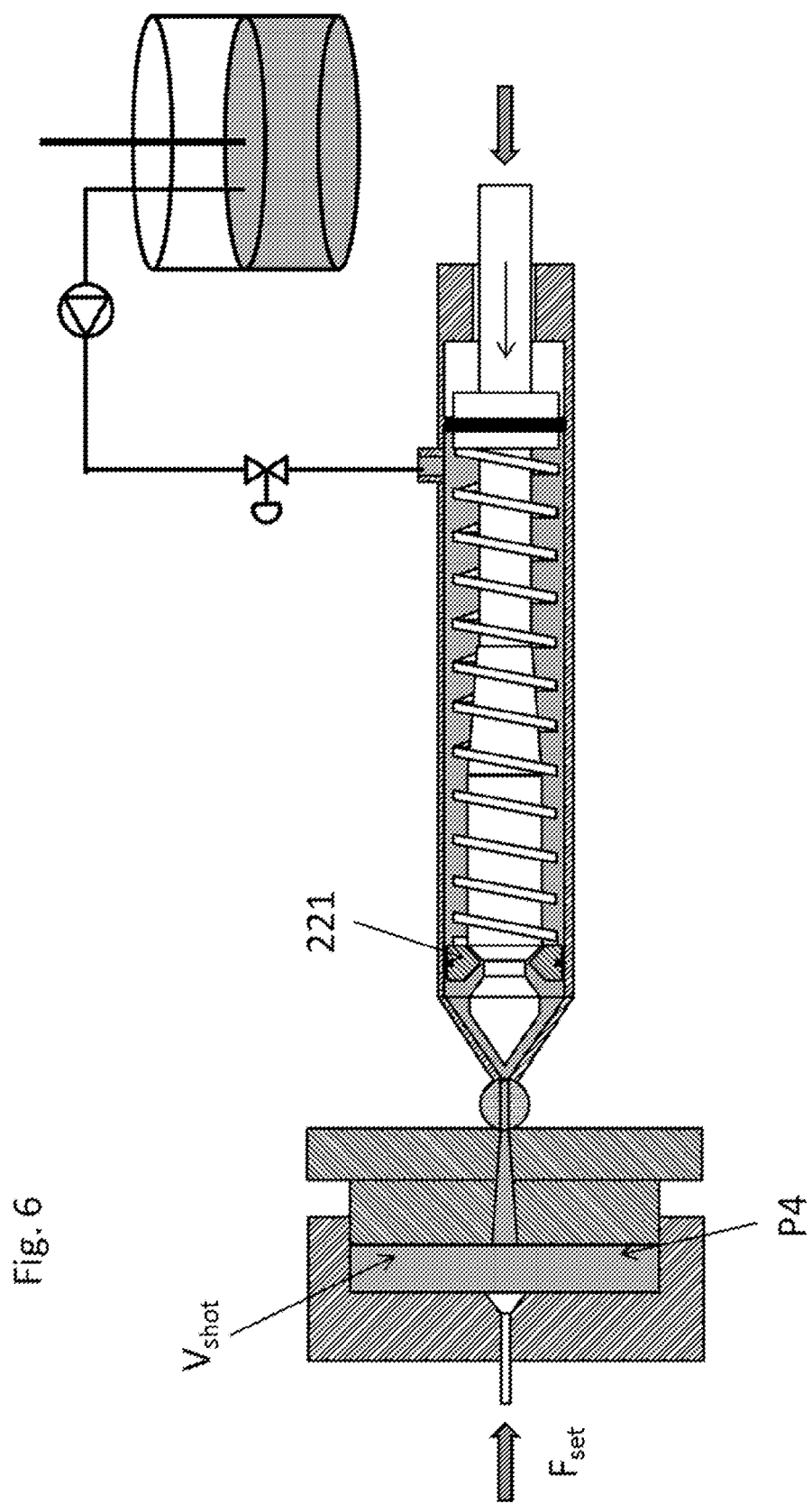
FIG. 6 shows schematically the apparatus of FIG. 3 in the mould filling and expansion phase of the first embodiment of a method of producing semi-foamed embryos in accordance with the present invention.

Once the mould has been initially filled, the mould filling phase as shown schematically in FIG. 6 takes place. In this phase the ram-screw advances towards the nozzle dragging the check ring 221 with it (which prevents back flow), thereby forcing plastic melt into the mould cavity. The mould is allowed to expand, as further melt is injected pushing the moveable mould half, so that it can receive the shot volume ($V_{shot}$) of melt and during this expansion of the mould the pressures inside the mould (P4) and bore of the injection unit ($P_2$ and $P_3$) are controlled in order to ensure that they are always above the pressure $P_{critical}$ needed to prevent pre-mature foaming of the plastic melt. The control of the pressures may be done using any suitable means. This corresponds to step 1104 in FIG. 11.

Figure 7:
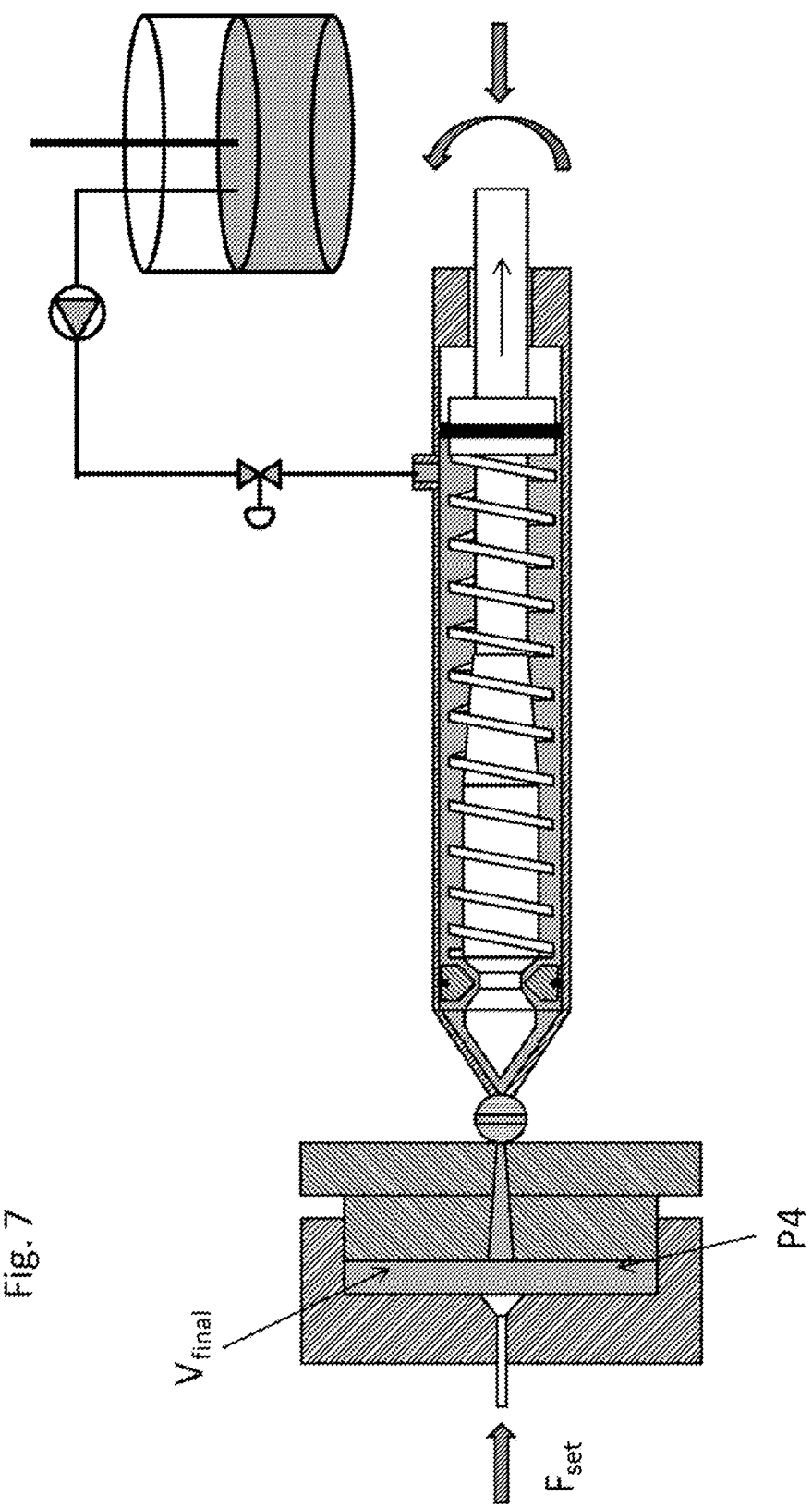
FIG. 7 shows schematically the apparatus of FIG. 3 in the mould-cooling under constant pressure phase of the first embodiment of a method of producing semi-foamed embryos in accordance with the present invention.

FIG. 7 shows schematically the apparatus of FIG. 3 in the "mould-cooling under constant pressure phase". During this phase the nozzle shut-off valve is closed and the dosing pump is running in order to refill the bore of the injector unit with plastisol at the same time as the ram-screw is forced back to the return or back position corresponding to the desired shot volume. As the hot plastic melt was injected into a cold mould it will cool down and the negative thermal expansion will result in a contraction of its volume. To prevent unwanted foaming of the embryo, the clamping force on the mould is maintained so that the contraction of the plastic melt is mirrored by the contraction of the mould volume to the final, or desired, volume of the embryo $V_{final}$, thus ensuring that the pressure in the mould remains at the pressure $P_{cavity}$ needed to prevent cell nucleation of the melt. At the final, or desired, volume $V_{final}$, the temperature T of the embryo has fallen to, or below, $T_{final}$—a temperature at which the melt is no longer a liquid but has set to a solid or gel-like consistency and is now shape-stable enough to withstand the cell nucleation and expansion foaming which would otherwise occur due to the pressure drop experienced during the mould opening. In one embodiment the temperature of the hot melt or gel in the mould is controlled and the temperature in the cooling system and/or the time may be adjusted dependent on the temperature of the hot melt or the formed gel. Any suitable means to control the temperature may be used and may be communicating with means for controlling the pressures in the mould and in the injection unit. Depending, amongst others, on the volume of plastic in the mould, the plastic's and the mould's temperature and the cooling characteristics of the mould, this phase may last from a few seconds to several minutes. Preferably the system is arranged so that the time taken for the plastisol and mould to cool is adjusted depending to the shot volume, larger shot volume longer time. Preferably the time should be as short as possible. The time depends on the cavity depth or the thickness of the moulded product. This corresponds to step 1105 in FIG. 11.

Figure 8:
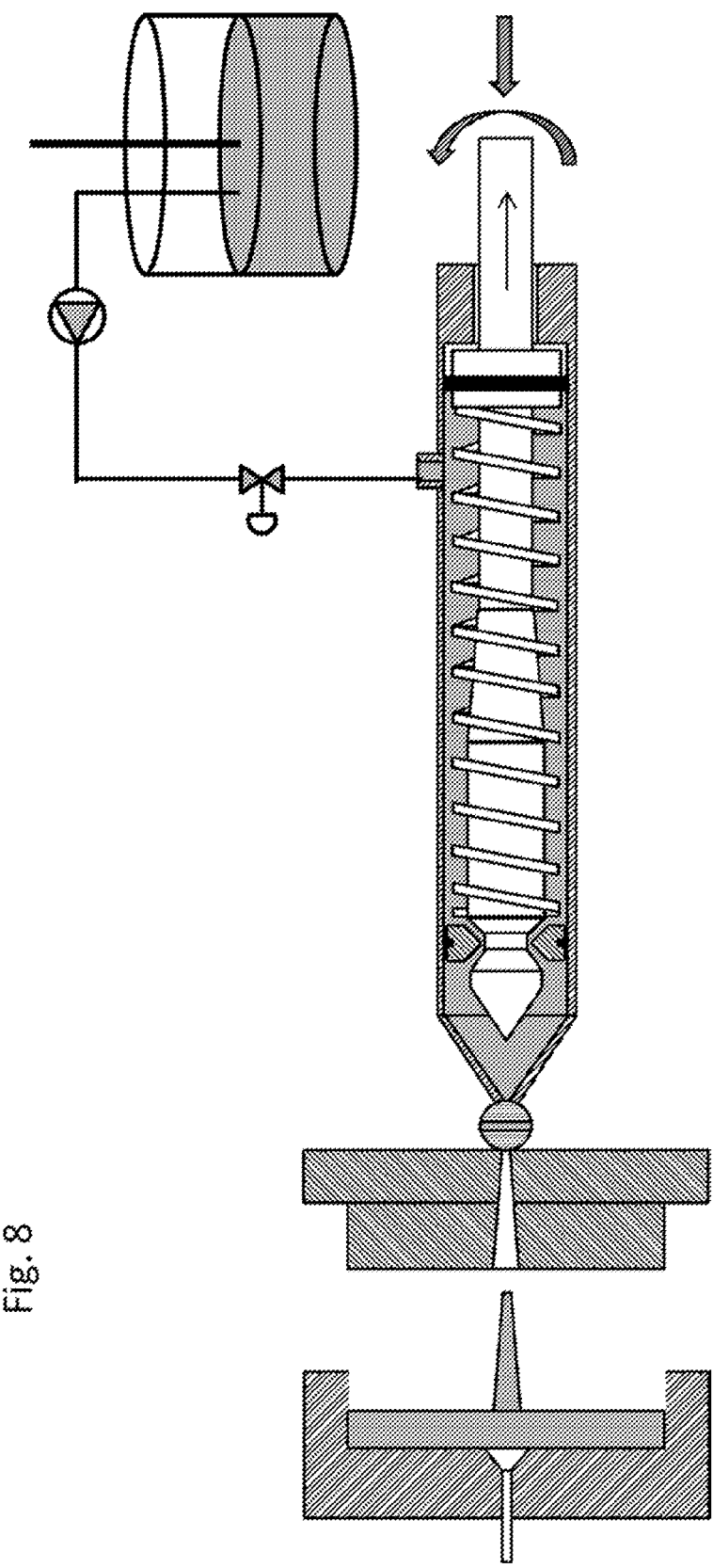
FIG. 8 shows schematically the apparatus of FIG. 3 in the mould opening and metering phase of the next shot, of the first embodiment of a method of producing semi-foamed embryos in accordance with the present invention.

FIG. 8 shows schematically the apparatus of FIG. 3 in the mould opening and metering phase. In this phase the dosing pump is still running in order to fill the bore and the back pressure exerted on the ram-screw is maintained in order to ensure that all the plastisol and melt in the bore is subjected to a pressure which is greater than the pressure at which the plastisol or melt would start to foam, thus preventing foaming of the material in the bore. This corresponds to the first part of step 1106 in FIG. 11.

Figure 9:
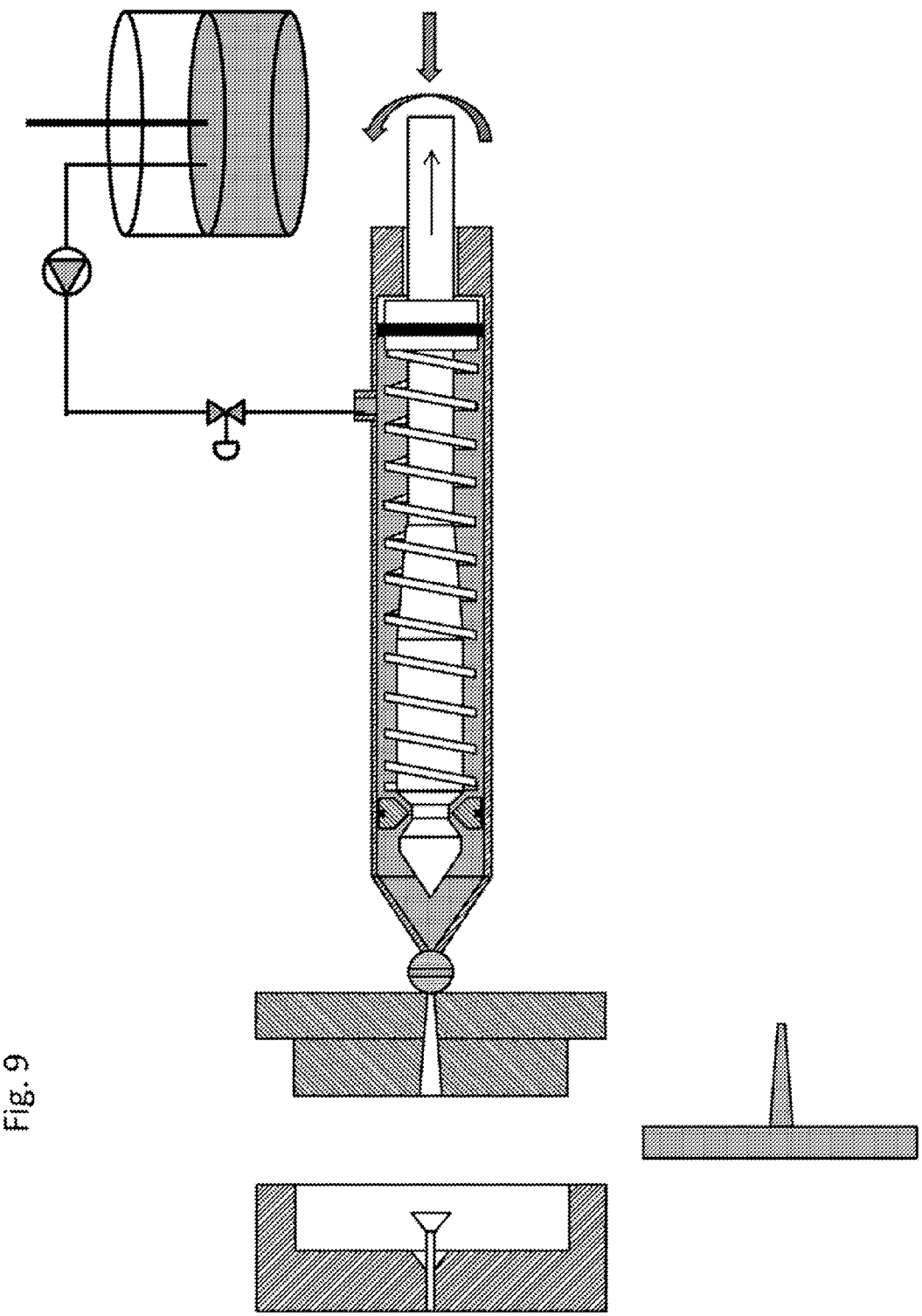
FIG. 9 shows schematically the apparatus of FIG. 3 in the de-moulding and metering phase of the next shot, of the first embodiment of a method of producing semi-foamed embryos in accordance with the present invention.

FIG. 9 shows schematically the apparatus of FIG. 3 in the de-moulding and metering phase in which the ejector pushes the embryo out of the mould and the metering of the next shot continues. The ejection occurs at the end of step 1106 in FIG. 11.

Figure 10:
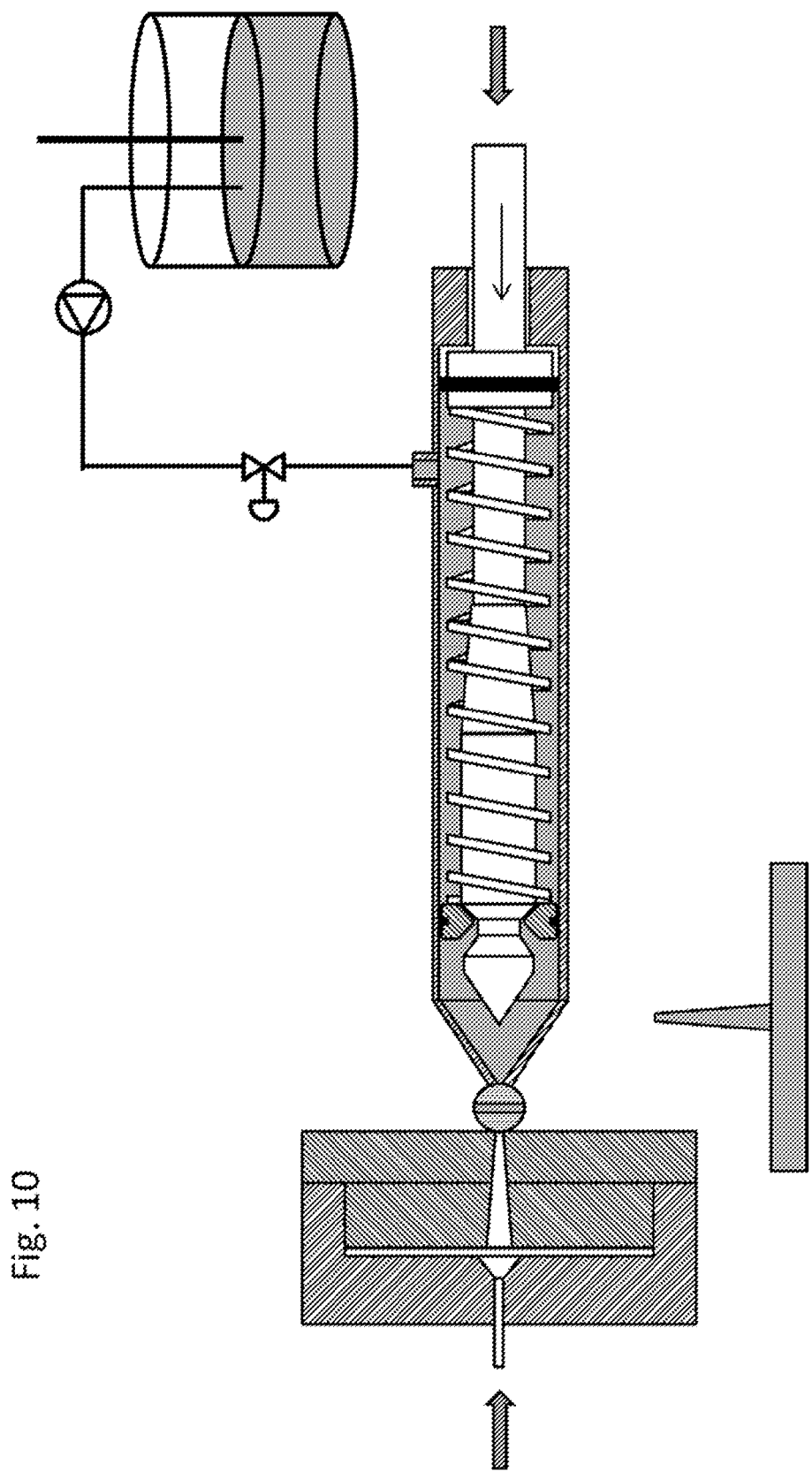
FIG. 10 shows schematically the apparatus of FIG. 3 in the mould closing phase of the first embodiment of a method of producing semi-foamed embryos in accordance with the present invention.

FIG. 10 shows schematically the apparatus of FIG. 3 in the mould closing phase where the mould is being returned to the position where the mould cavity is at its minimum volume and clamped with clamping force $F_{set}$. The system is then ready for the next injection cycle to begin. This corresponds to step 1101' in FIG. 11.

Figure 11:
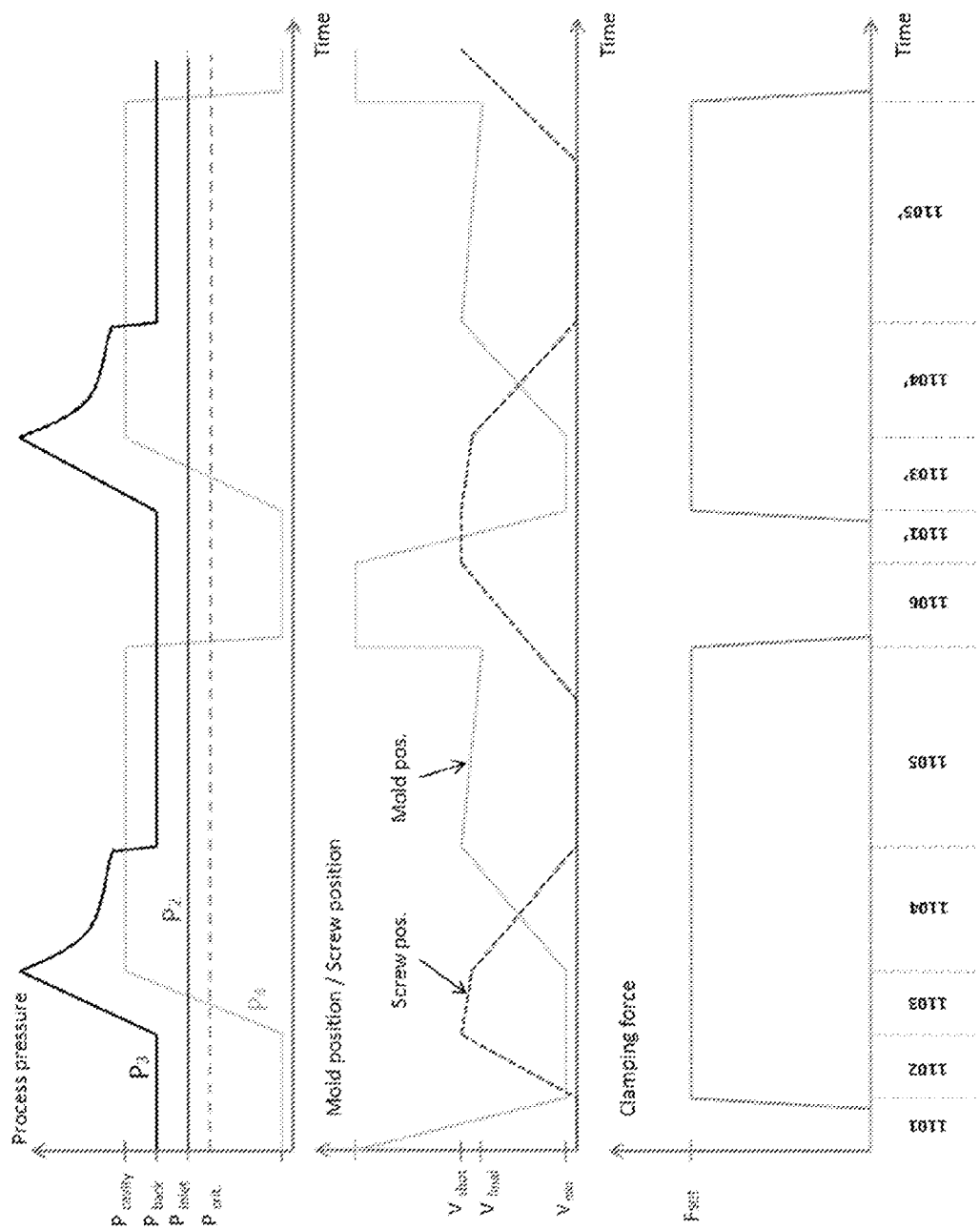
FIG. 11 is a graph showing how the pressures in the various parts of the system vary during an injection cycle.

FIG. 11 shows an example of how pressures and clamping forces in the apparatus can be set during the different phase of the method.

In a conventional injection moulding process the expandable mould is closed by a clamping actuator and the clamping force is build up to a certain initial set point before starting the injection. In a hydraulically actuated system this is achieved by increasing hydraulic pressure until the clamping force has reached the required value. After reaching the required initial set point value the hydraulic system is locked and remains locked until the end of the process when the mould opening occurs, i.e. there is no active pressure control of the mould closing force during the injection process. This makes it impossible for the halves of the expandable mould to move during injection and cooling.

In a system according to the present invention, the clamping pressure on the mould is continuously controlled throughout the whole injection and cooling sequence using any suitable means. This means that the movable mould half will be allowed to move away from the fixed mould half in order to increase the volume of the mould cavity during the injection as soon as pressure exerted by the injected hot melt inside the mould (the cavity pressure) results in a counter-acting force that exceeds the clamping force of the clamping actuator. In other words, the high injection pressure during the injection will overcome the pressure inside the hydraulic actuator and cause an expanding movement of the movable mould half. By the continuous control of clamping hydraulic pressure the mould expansion is synchronized with the injection of the melt and the opening of the mould can be controlled by the settings of the injection speed. In this way it is possible to control the cavity pressure and ensure that it always exceeds a predetermined cavity pressure during this phase of the process. The level of cavity pressure heavily influences the cell size of the final product and a high cavity pressure gives small uniform cells.

Due to the continuous control of clamping hydraulic pressure during injection and cooling, it is possible to achieve controlled pressure in the mould during the mould closing action which takes place as the mould and its contents cool. During this cooling time the plastic will experience a "negative thermal expansion" i.e. cooling down the melt will make the plastic contract. By providing continuous control of the clamp hydraulics it is possible to get a "closing" movement of the movable mould-half that ensures that the predetermined cavity pressure is maintained at the set point at all times. This closing action and maintenance of the cavity pressure ensures that the blowing gas is maintained in solution inside the material and does not form gas bubbles which would result in undesirable cells in the embryo. In the absence of any control of the pressure during cooling down of the mould, then the cavity pressure would decrease in proportion to shrinkage of the material as it cools. The decrease in cavity pressure would mean that cell nucleation would not be under control and this would lead to a non-optimal cell structure. By maintaining control of the cavity pressure during cooling, nucleation is suppressed. Cell nucleation can only happen after cooling has finished and when the pressure on the cooled embryo is released during opening of the mould. However although cell nucleation occurs at this points, uncontrolled expansion of the embryo cannot take place as the consistency of the cooled-down embryo prevents this.

In a conventional injection moulding process a "back pressure" is set which is used during the metering of a shot volume. The "back pressure" is generated by putting a certain force on the screw, acting in the axial direction towards the mould at the same time as the ram-screw is turning. The result is a certain melt pressure maintained on the material in front of the tip of the screw during the metering. After the metering is finished it is normal that the bore is depressurized, i.e. the axial force on the screw is released. This situation is maintained until the shot will be injected into the mould. Then, during the injection, an axial injection force (normally much higher than the back pressure) is put on the ram-screw to fulfil the desired injection speed (ccm/s) of the injection setting. The injection speed may be from 25 ccm/s to 300 ccm/s. After the injection sequence has finished the bore will be depressurized again. Sometimes the injection unit is backed off from (i.e. moved back so that is no longer touching) its contact point with the mould in order to avoid heat transfer from injection unit tip to the mould and/or cooling down of the tip by the relatively cooler mould).

Such a system is unsuitable for production of plastisol embryos. Depressurization of the bore would make the plastisol melt that is inside the bore foam uncontrollably giving a very unfavourable cell structure with big gas bubbles. The plastisol melt, on its way through the bore along, and in front of the screw, needs to be kept above a certain, critical level of pressure ($P_{critical}$). This critical level of pressure ensure that the blowing gas, e.g. generated from the decomposition of the chemical blowing agents, is dissolved into the melt and not nucleated to generate bubbles. It is very crucial that the pressure throughout the bore and throughout all the process steps is maintained above the critical level. The critical pressure level needed is dependent on the level of blowing agent in the formulation and the temperature profile of the injection unit. Higher blowing agent levels needs higher internal bore pressure. Higher bore temperatures require higher internal bore pressures to avoid cell nucleation.

In a system in accordance with the present invention, the control unit for the axial force on the screw is always controlled to ensure that the axial force is above the critical level necessary for maintaining a pressure on the material inside the bore which is above the critical nucleation pressure ($P_{crit.}$). This pressure maintains the generated gas in solution and prevents it from causing foaming of the melt.

Due to this continuous high pressure level in the bore it is necessary to have some means to close the nozzle, such as a shut off valve, at the nozzle of the injection unit or at the inlet port of the mould that is only open during injection sequence. Preferably the nozzle shut off valve is closed after injection of the shot volume ($V_{shot}$). If it would be open during cooling then there is a risk of getting a back flow of melt from the mould cavity into the bore. This would happen if the set clamping force/cavity pressure is higher than the set back pressure ($P_{back}$). As an alternative a hot runner with a closing pin could also be used. Furthermore, in the absence of a closed shut off nozzle or the like, an unwanted pressure drop would occur in the bore during de-moulding which would result in uncontrollable foaming inside the bore. In one embodiment the same clamping pressure is maintained during the whole injection moulding process, and in another embodiment the clamping pressure is altered during the whole injection moulding process.

In another embodiment of the present invention a system for producing foamable embryos comprises an injection unit and a plurality of expandable moulds. The system is arranged so that the injection unit is substantially fixed in a predetermined position and moulds are moved in turn to a position where the mould can be filled and then, while maintaining the clamping pressure on the mould, moved to a position where the mould can cool down and the embryo ejected. In this way there is no need to wait until a mould has cooled down and the embryo ejected before the next mould can be filled. This results in an increase in productivity of the system.

In a further embodiment of the invention a plurality of moulds are arrange in a line and the injection unit is arranged to move from mould to mould. Each time it reaches an empty mould it will perform an injection of hot melt into the mould and, before the mould and hot melt has cooled, move to the next mould that is to be filled. This results in an increase in productivity of the system.

In yet another embodiment of the invention, an injection unit is provided with an injection manifold comprising a plurality of exits, each of which leads to a different mould. Each exit can be provided with a valve and the system operated so that when the injection takes place during an injection cycle only one valve is open, thus causing the melt to be fed only into the mould on the other side of the valve. In the following injection cycle a different valve is opened, thus causing the melt to be fed into a different mould.

In order for the plastisol to be processed according to the present invention it needs to be able to be pumped. Preferably the solid polymeric particles are small or in the form of a powder. The plastisols used in a system in accordance with the present invention preferably have the following ingredients, in which all percentages are by weight:

Polymeric powder (for example PVC (polyvinyl chloride)) 35-60%. Preferably the polymer is a suspension polymerised grade of PVC (sPVC) alone or a mixture of sPVC with emulsion polymerised PVC (ePVC);

Anhydride 1-15%. The anhydride is preferably cyclic dicarboxylic anhydride, e.g. phtalic anhydride or preferably a 70/30 mix of cyclohexane-1,2-dicarboxylic anhydride and 4-methyl-hexahydrophtalic anhydride that is liquid at room temperature;

Isocyanate 20-60%. The isocyanate is preferably based on liquid versions of diphenylmethane-4,4'-diisocyanates (4,4'-MDI), e.g. CDMDI (carbodiimide modified 4,4'-MDI) and polymeric MDI (pMDI), either used individually or as a mixture;

Blowing agent 0.5-7%. The blowing agents can be 2,2'-azobis-isobutyronitrile (AIBN), azodicarbonamide (ADC), sodium bicarbonate and citric acid, either used independently as a sole chemical blowing agent or as a mix. As alternatives to chemical blowing agents, physical blowing agents could be used, e.g. cyclopentane, $CO_2$, acetone, or other liquids with a low temperature boiling point;

Processing aids such as lubricants 0-1%. A processing aid could be a hydrocarbon wax that is only moderately soluble in the PVC melt so that during heating inside injection barrel it will migrate out to the interface between the melt and the steel surfaces inside the heated injection barrel. Here it will act as a lubricant on the hot surface thus making sure that the PVC will not stick or stagnate and become overheated with the attendant risk for heat degradation; and additives. The additives can be incorporated to the formulation to make a change of the physical-chemical behaviour of the final product. For example, plasticizers like phthalate- and adipate-esters or organic phosphates can be added to tailor make the strength and stiffness needed for the end application. Plasticizers also increase the fracture toughness of the material and giving higher impact energy absorption capabilities. They may make up from 0-10% of the formulation. The anhydride and the isocyanate may act as plasticizer for example during the moulding processes. Flame retardants can be added to the formulation to improve the fire and smoke resistance of the final material and can be from 0 to 10% of the formulation. Inorganic fillers can be added to the formulation to serve as cell nucleation sites or as an additive to increase the material stiffness and can be from 0 to 10% of the formulation. PVC heat stabilizers can be added to the formulation to increase the heat stability of the material during the injection moulding process, e.g. if the process is running with settings that make long residence time of the melt inside the heated barrel (for example when there is a small shot volume relative to the maximum shot volume of the machine) and can be from 0 to 2% of the formulation. Cross-linking catalysts and surfactants can be added to form from 0-1% of the formulation. The above mentioned ingredients should not be seen as limiting, a person skilled in the art knows what reagents may be used. For example other cross-linkers and cross-linking chemistry may be used.

Other polymers suitable to be injection moulded using the method according to the present invention are various polystyrenes, polyacrylates or cellulose esters or combinations thereof. In one embodiment the plastisol comprises at least one of the following non-limiting examples:

SAN Styrene-AcryloNitrile polymer
PS PolyStyrene
PMMA PolyMethylMethAcrylate
PBMA PolyButyl MetAcrylate
PA PolyAmide
PC PolyCarbonate
PET PolyEthylene Terephthalate
PE PolyEthylene
CPE Chlorinated PolyEthylene
or cellulose esters like
CA Cellulose Acetate
CTA Cellulose Tri-Acetate
CAB Cellulose Acetate Butyrate
CAP Cellulose Acetate Propionate
or any combinations or co-polymers thereof together with suitable cross-linker. That the present invention works for various polymeric materials is shown in the examples as disclosed in FIG. 17. In one embodiment the plastisol comprises an essentially amorphous polymer. In another embodiment the plastisol comprises an essentially crystalline polymer. In one embodiment the plastisol comprises PMMA. In another embodiment the plastisol comprises SAN. In another embodiment the plastisol comprises a co-polymer of PMMA and another acrylic co-monomer for example butyl methyl acrylate. In another embodiment the plastisol comprises cellulose esters for example cellulose acetate propionate. In another embodiment the plastisol comprises a mixture of PVC and another polymer. In one embodiment the plastisol comprises a mixture of PVC and PMMA. In another embodiment the plastisol comprises a mixture of PVC and SAN.

In one embodiment the plastisol comprises solid polymeric particles and anhydride and isocyanate.

In one embodiment of the present invention the plastisol comprises polyvinyl chloride, anhydride preferably a dicarboxylic anhydride, isocyanate and a blowing agent.

Preferably the temperatures and pressures in the system are controlled. Suitable temperatures in the injection unit are:
plastisol temperature 15-25° C., inlet zone temperature 15-25° C., feeding zone 25-120° C., compression zone 25-150° C., melt zone 100-180° C., melt-reserving section 120-180° C., and nozzle tip 120-180° C.

The mould cooling temperature preferably should be between 5 and 50° C. In one embodiment the cooling temperature is the same during the whole injection moulding process. In another embodiment the cooling temperature is varied during the injection moulding process.

The pressure settings preferably should be:
pump pressure 50-150 bar, back pressure 50-150 bar, cavity pressure 50-400 bar.

The present invention further relates to an injection moulded product wherein an embryo is obtainable by producing an embryo according to the present invention and exposing said embryo to expansion and cross-linking the embryo using heat and water or steam. The embryo body is expanded through an additional heat treatment in water and/or a steam oven. The formation of the final rigid foamed material is a result of a hydrolysis reaction of the isocyanate groups present in the material, with the subsequent build-up of a polymer which crosslinks the chemical structure.

Figure 12:
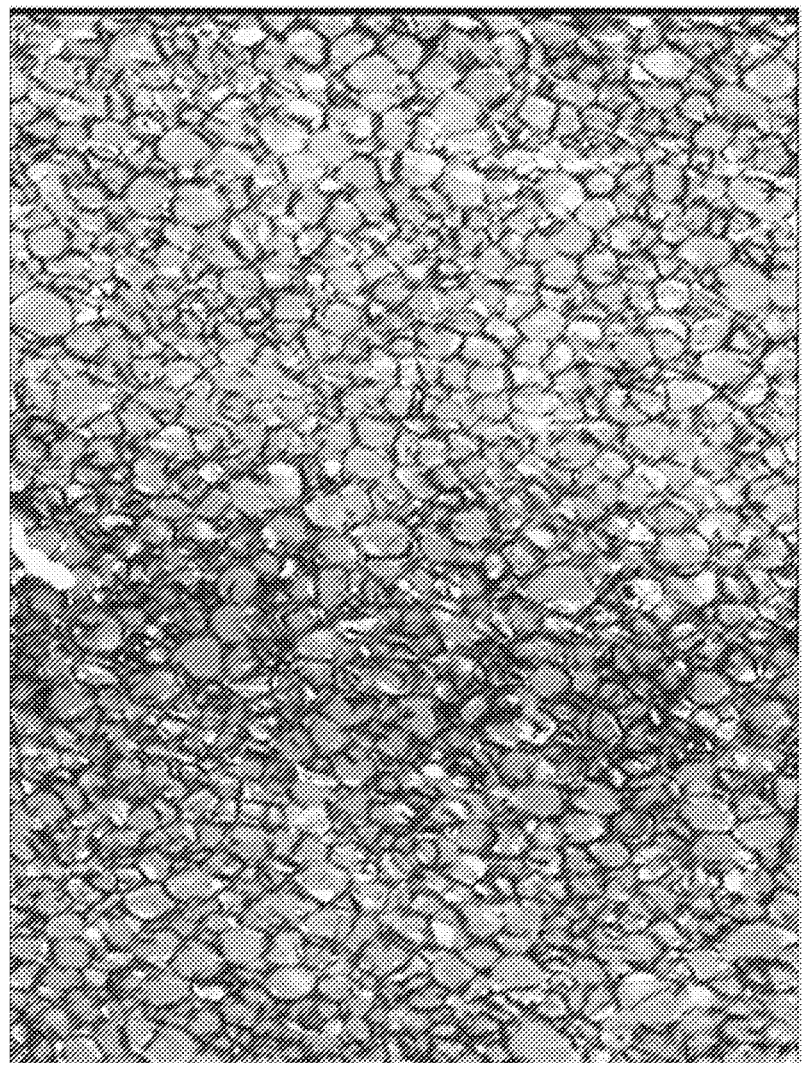
FIG. 12 cell structure of expanded foam having an average cell size (diameter) of 80 µm. Cavity pressure 300 bars, density 80 kg/m³. 100× magnification.
Figure 13:
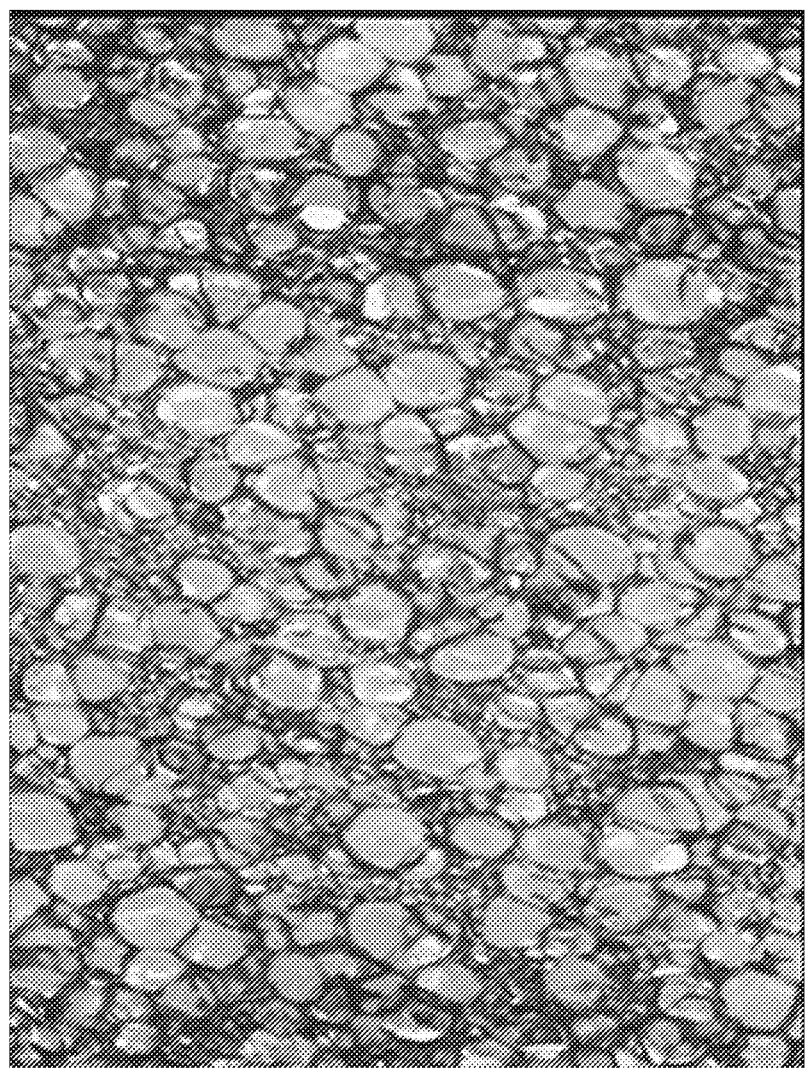
FIG. 13 cell structure of expanded foam having an average cell size (diameter) of 150 µm. Cavity pressure 200 bars, density 80 kg/m³. 100× magnification.
Figure 14:
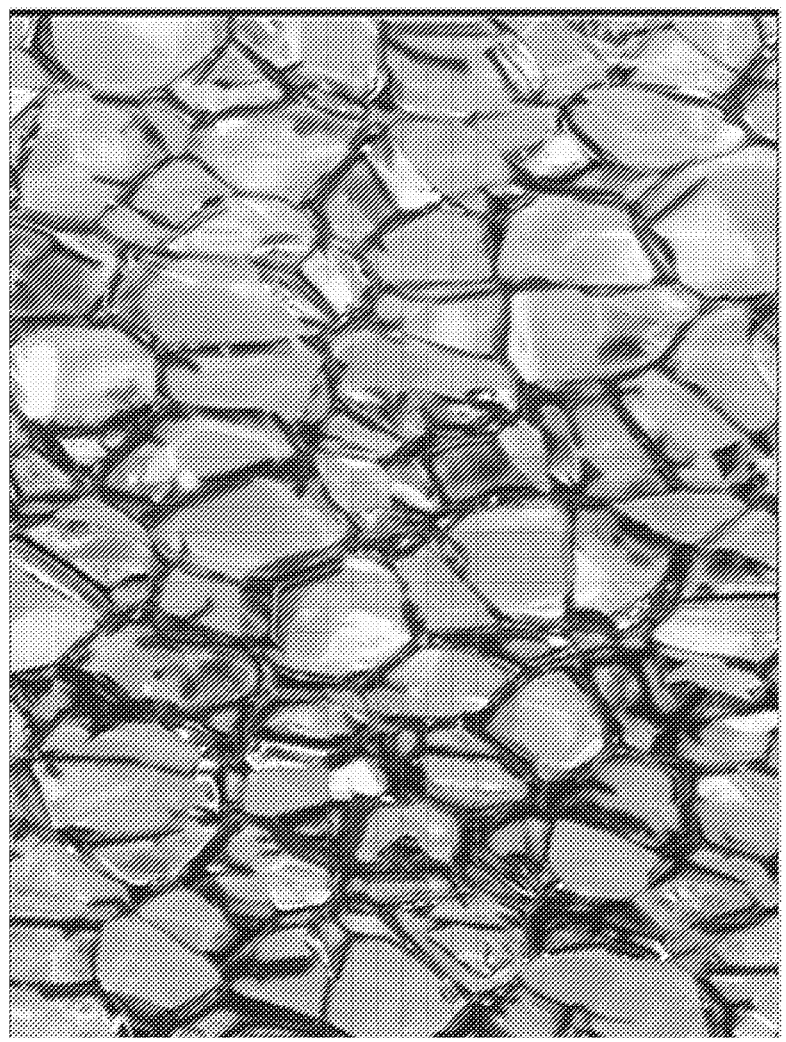
FIG. 14 cell structure of prior art expanded foam, cell size (diameter) 300 µm, density 80 kg/m³. 100× magnification.

The product according to the present invention is an expanded foam of any suitable polymer or polymer mixture. The foam has typically a density of from 25 $kg/m^3$ to 400 $kg/m^3$, a cell size of from 10 µm to 1 mm and a compressive modulus of at least 50 MPa. The method of the present invention makes it possible to achieve micro or sub micro cellular structures in an expanded foam where the foam has improved mechanical properties. The method also makes it possible to control the cell size by adjusting the various pressures, for example the cavity pressure, see FIGS. 12-14.

Figure 15:
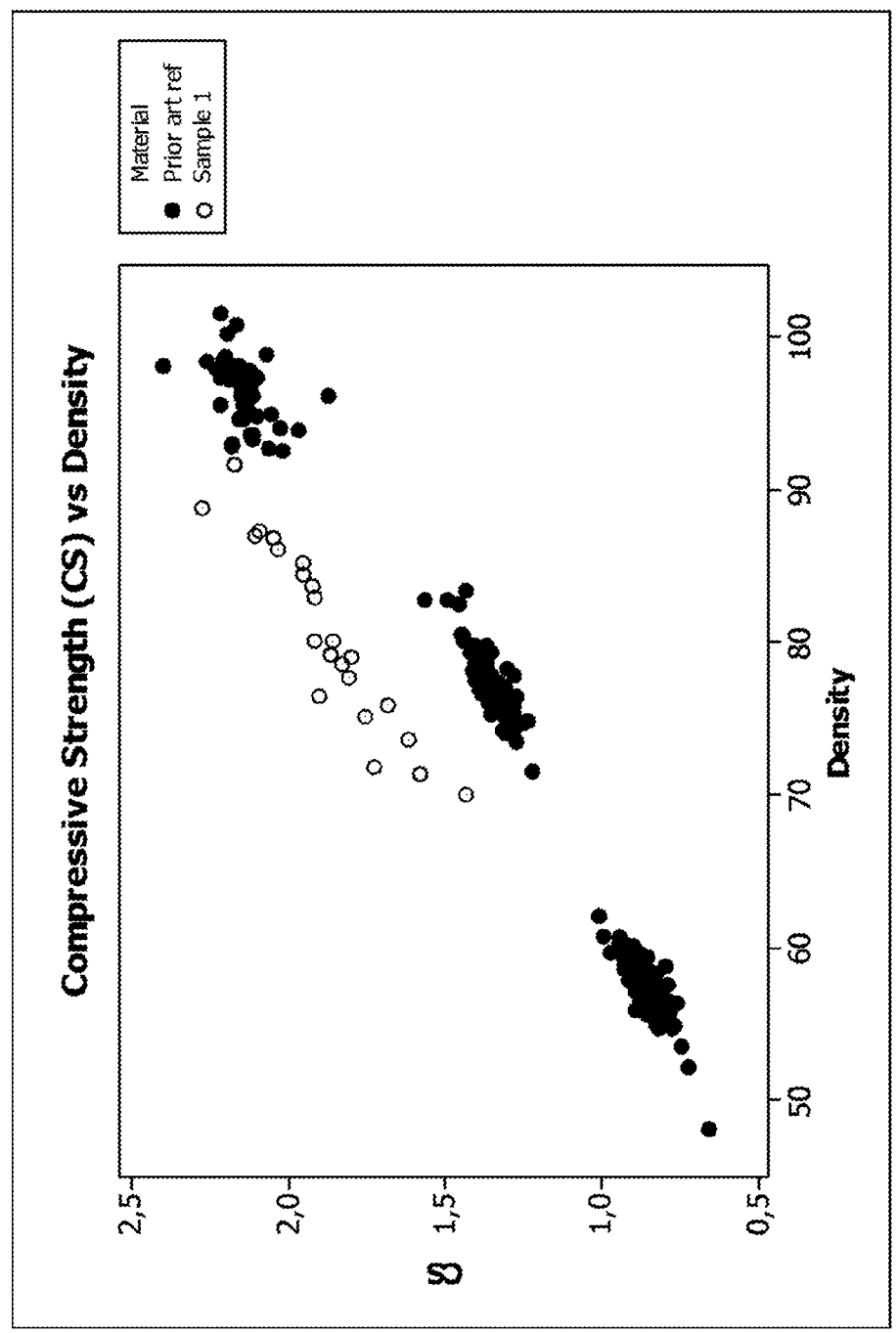
FIG. 15 discloses compressive strength vs density for two PVC foams.
Figure 16:
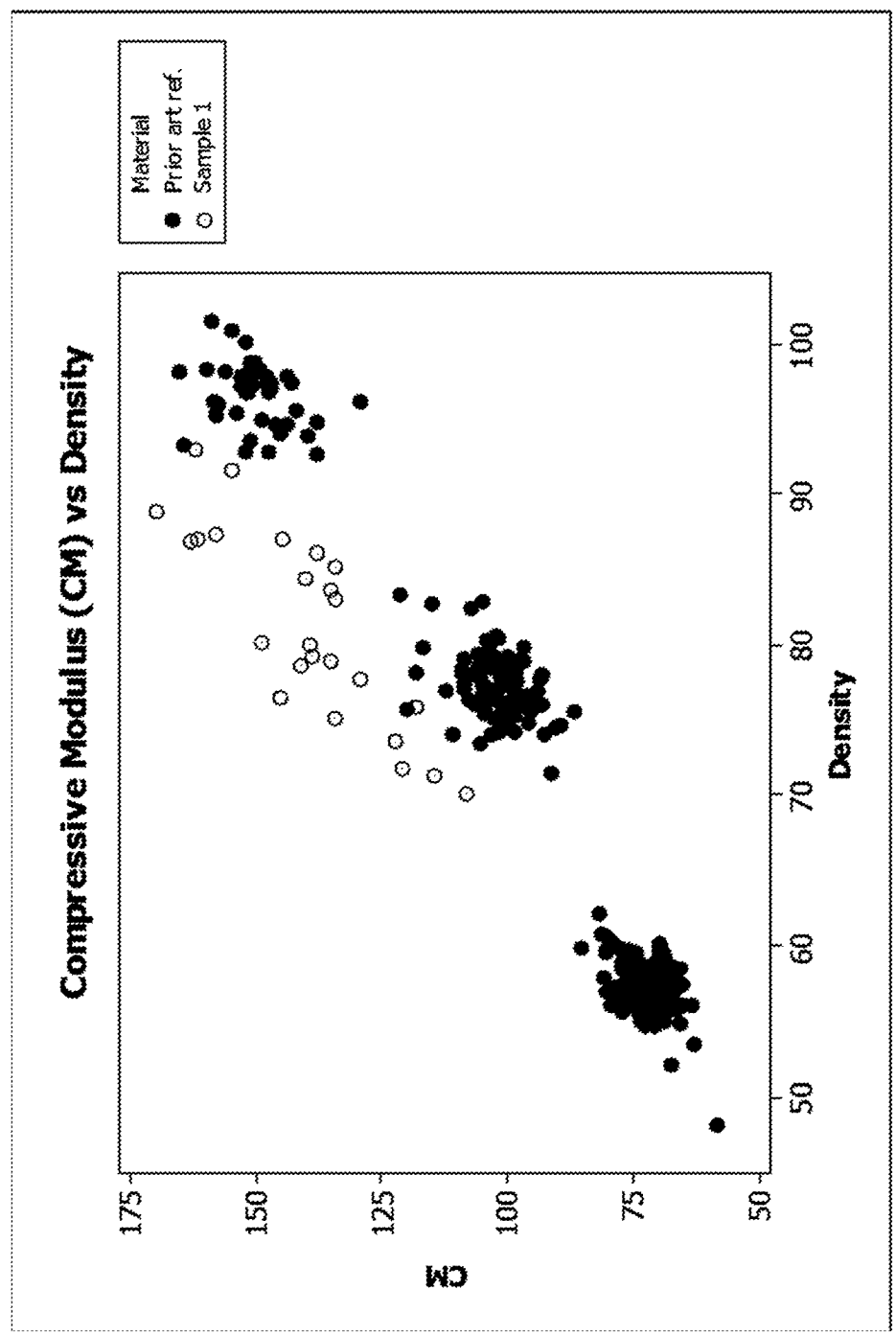
FIG. 16 discloses compressive modulus vs density for two PVC foams

The improved mechanical properties make it possible to use a lower density material in order to achieve the same compressive strength or modulus, see FIG. 15-16 and Table 1. Density and compressive strength and compressive modulus are linked to each other, lower density results in lower compressive strength or modulus and vice versa. However the foam of the present invention has a higher compressive strength to density ratio than ordinary expanded foams. FIGS. 15 and 16 disclose a diagram of compressive strength (MPa) vs density (kg/m$^3$) and compressive modulus (MPa) vs density (kg/m$^3$) respectively. The reference is an expanded foam produced according to standard procedure, see for example WO2007141647.

The density of the foam according to the present invention may be 25 kg/m$^3$ or more, or 45 kg/m$^3$ or more, or 60 kg/m$^3$ or more or 80 kg/m$^3$ or more, or 400 kg/m$^3$ or less, or 300 kg/m$^3$ or less or 200 kg/m$^3$ or less, or 150 kg/m$^3$ or less, or 110 kg/m$^3$ or less, or 100 kg/m$^3$ or less. In one embodiment the density range is 45 kg/m$^3$ to 110 kg/m$^3$. The density was measured according to ISO 845:2006.

TABLE 1

Specific compression strength to density ratio and specific modulus to density ratio for expanded PVC foams produced using prior art standard technology and expanded foams according to the present invention.

| Density range | Specific Compr. Strength (MPa/(kg/m3)) | | Specific Compr. Modulus (MPa/(kg/m3)) | |
|---|---|---|---|---|
| (kg/m3) | Prior art | Sample 1 | Prior art | Sample 1 |
| 25-40 | 0.012 | 0.015 | 1.05 | 1.28 |
| 41-55 | 0.013 | 0.018 | 1.04 | 1.40 |
| 56-70 | 0.015 | 0.021 | 1.17 | 1.49 |
| 71-90 | 0.018 | 0.023 | 1.13 | 1.58 |
| 91-115 | 0.020 | 0.025 | 1.35 | 1.64 |
| 116-145 | 0.023 | 0.027 | 1.31 | 1.69 |
| 146-180 | 0.021 | 0.029 | 1.25 | 1.72 |
| 181-230 | 0.027 | 0.030 | 1.55 | 1.74 |
| 231-280 | 0.029 | 0.031 | 1.60 | 1.77 |
| 281-340 | 0.026 | 0.031 | 1.61 | 1.78 |
| 341-380 | 0.028 | 0.032 | 1.64 | 1.79 |
| 381-420 | 0.029 | 0.032 | 1.63 | 1.80 |

The PVC foams of table 1 are derived from a PVC plastisol wherein the plastisol comprises PVC, anhydride, blowing agent and isocyanate. As seen in Table 1, the ratio between density and compressive strength, and compressive modulus is significantly higher for sample 1 in comparison with foams obtained with prior art technology. For example the expanded foam of the present invention has a compressive modulus to density ratio of at least 1.28 for foams with a density of 25-40 kg/m$^3$, or at least 1.40 for foams with a density of 41-115 kg/m$^3$, or at least 1.69 for foams with a density of 116-420 kg/m$^3$. In one embodiment the foam has a ratio of at least 1.49 for foams with a density of 56-180 kg/m$^3$.

The cell size may be 10 μm or more, or 50 μm or more, or 100 μm or more, or 200 μm or more, or 300 μm or more, or 1000 μm or less, or 800 μm or less, or 600 μm or less, or 400 μm or less, or 350 μm or less. The cell size was determined according to ASTM D3576-04. In one embodiment the cell size is 150 μm or less in a foam having a density up to 115 kg/m$^3$. In another embodiment the cell size is 130 μm or less in a foam having of up to 115 kg/m$^3$. In another embodiment the cell size is 100 μm or less, preferably 80 μm or less, in a foam having a density up to 400 kg/m$^3$.

As mentioned above the expanded foam of the present invention exhibits very good mechanical properties, especially compressive strength and compressive modulus. The compressive strength of the foam is 0.3 MPa or more, or 0.5 MPa or more, or 0.75 MPa or more, or 1 MPa or more, or 1.5 MPa or more. The compression modulus of the foam is 40 MPa or more, or 50 MPa or more, or 80 MPa or more, or 100 MPa or more, or 125 MPa or more. The compressive strength and modulus were measured according standard technology and methods, ASTM D 1621.

EXAMPLES

Example 1

Sample 1 was prepared according to:
Plastisol Content:

| Components | Content (weight %) |
|---|---|
| sPVC | 15.1% |
| ePVC | 30.8% |
| Anhydride | 10.0% |
| Isocyanate (CDMDI/pMDI) | 39.6% |
| Blowing agent (AZDN/ADC) | 4.4% |
| Processing aids (lubricants) | 0.1% |

The PVC in this experiment comprised two different PVCs, sPVC is a suspension polymerized PVC and ePVC is an emulusion polymerized PVC.

The anhydride is preferably cyclic dicarboxylic anhydride, e.g. phtalic anhydride or preferably a 70/30 mix of cyclohexane-1,2-dicarboxylic anhydride and 4-methyl-hexahydrophtalic anhydride that is liquid at room temperature. The Isocyanate is preferably based on liquid versions of diphenylmethane-4,4'-diisocyanates (4,4'-MDI), e.g. CDMDI (carbodiimide modified 4,4'-MDI) and polymeric MDI (pMDI), pure or as a mix. The lubricant is hydrocarbon wax.

| Injection unit | |
|---|---|
| Plastisol temperature | 20° C. |
| Inlet zone | 20° C. |
| Feeding zone | 100° C. |
| Compression zone | 120° C. |
| Melt zone | 140° C. |
| Melt-reserving section | 165° C. |
| Cylinder tip and hot runner system | 165° C. |
| Mould unit | |
| Mold cooling temperature | 15° C. |

| Pressure | |
|---|---|
| Pump pressure | 100 bar |
| Back pressure | 110 bar |
| Cavity pressure | 200 bar |
| Metering speed* | 200 mm/s |
| Injection speed | |
| Start (initial volume) | 100 ccm/s |
| Mid (bulk volume) | 250 ccm/s |

| | |
|---|---|
| End (last 10%) | 25 ccm/s |
| Mould Initial cavity depth | 1 mm |

Results are disclosed in FIG. 15-16 and in Table 1.

Example 2

Examples (denoted Example 1-14) using other compositions and set ups are disclosed in FIG. 17. In said examples plastisols comprising ePVC, sPVC, SAN and PMMA-co-PBMA have been used.

Briefly the method was performed as described above at the conditions stated in FIG. 17. As polymeric powder mixtures of ePVC (5.8-30.8%) and SPVC (15.1-41.0%) were used, or sPVC (34%), or PMMA-co-PBMA (5.8-45.5%), or SAN (5.8-45.5%). Anhydride (4-11.9%), blowing agent (2.5-4.4%), MDI (39.4-50.0%), lubricant (0.1%) and surfactant (0-0.5%) were also used.

Density, compression strength, compression modulus and cell size was determined for each sample.

The invention claimed is:

1. A product obtained by preparing an embryo having a volume $V_{final}$ and exposing said embryo to expansion and cross-linking said embryo using heat and water or steam, wherein preparing the product from said embryo comprises the steps of:
   providing a plastisol;
   providing an injector unit for injection moulding comprising a barrel with a nozzle and a control unit adapted to control back pressure $P_{back}$ inside the barrel and to maintain said back pressure $P_{back}$ above a critical foaming pressure;
   providing a mould comprising an injector port, a force exerting means, a first mould half and a second mould half together forming a mould cavity with a cavity volume, wherein the first and second mould halves are moveable in relation to each other to vary the cavity volume, wherein the mould is provided in a cold state having a cavity volume of $V_{min}$ and wherein the force exerting means exerts a controlled maintained clamping force $F_{set}$ on the mould cavity creating a clamping pressure $P_4$ inside the mould;
   connecting the injector port of the mould to the nozzle of the injector unit;
   adding the plastisol to the injector unit;
   preparing a shot volume $V_{shot}$ of hot melt of the plastisol in the injector unit;
   injecting the hot melt into the cold mould cavity of volume $V_{min}$;
   continuing injecting the hot melt into the cold mould cavity creating a cavity pressure $P_{cavity}$ equal to or higher than the clamping pressure $P_4$ forcing the mould to expand so that it can receive the shot volume $V_{shot}$;
   allowing the injected hot melt to cool forming the embryo, wherein the volume of the formed embryo contracts when the force exerting means of the mould exerts the controlled maintained clamping force $F_{set}$ thereby allowing the mould cavity to contract reducing a risk of a pressure drop in the mould cavity and causing foaming in the formed embryo; and
   opening the mould and removing the formed embryo; and
   exposing said embryo to expansion and cross-linking using heat and water or steam to form said product, said product being an expanded foam having an average a cell size of 350 μm or less.

2. The product of claim 1 wherein the plastisol comprises at least one of PVC, SAN, PS, PMMA, PC, CA, CAB, CAP, CTA, PET, PE, CPE and PA.

3. The product according to claim 1, wherein the plastisol comprises polyvinyl chloride, a dicarboxylic anhydride, isocyanate and a blowing agent.

4. The product according to claim 1, wherein the same clamping pressure $P_4$ is maintained during the whole injection moulding process or wherein the clamping pressure $P_4$ is altered during the whole injection moulding process.

5. The product according to claim 1, wherein the nozzle of the injector unit comprises a shut off valve in order to allow a cavity pressure higher than the back pressure $P_{back}$ without having a back flow of hot melt into the injector unit and to minimize a risk of a pressure drop in the barrel.

6. The product of claim 5 wherein the shut off valve is closed after injection of $V_{shot}$.

7. The product according to claim 1, wherein $V_{min}$ corresponds to an initial cavity depth greater than 0.2 mm and less than 4.2 mm.

8. The product according to claim 1, comprising an expanded PVC foam having a compressive modulus to density ratio of at least 1.28 for foams with a density of 25-40 kg/m$^3$.

9. The product according to claim 8 wherein the ratio is at least 1.49 for foams with a density of 56-180 kg/m$^3$.

10. The product according to claim 8 wherein the cell size is 150 μm or less in a foam having a density up to 115 kg/m$^3$.

11. The foam according to claim 8 wherein the foam is derived from a plastisol comprising PVC, anhydride, blowing agent and isocyanate.

12. The product according to claim 1 wherein $V_{min}$ corresponds to an initial cavity depth between 0.5 mm and 2.0 mm.

13. The product according to claim 1 wherein $V_{min}$ corresponds to an initial cavity depth between 0.9 mm and 1.4 mm.

14. The expanded PVC foam according to claim 8 having a compressive modulus to density ratio of at least 1.40 for foams with a density of 41-115 kg/m$^3$.

15. The expanded PVC foam according to claim 8 or at least 1.69 for foams with a density of 116-420 kg/m$^3$.

16. The foam according to claim 8 wherein the cell size is 100 μm or less in a foam having a density up to 400 kg/m$^3$.

17. The foam according to claim 8 wherein the cell size is 80 μm or less in a foam having a density up to 400 kg/m$^3$.

* * * * *